US012733023B2

(12) United States Patent
Wu et al.

(10) Patent No.: US 12,733,023 B2
(45) Date of Patent: Sep. 8, 2026

(54) INTER-UE COORDINATION INFORMATION-BASED RESOURCE ALLOCATION

(71) Applicant: QUALCOMM Incorporated, San Diego, CA (US)

(72) Inventors: Shuanshuan Wu, San Diego, CA (US); Kapil Gulati, Belle Mead, NJ (US); Tien Viet Nguyen, Bridgewater, NJ (US); Gabi Sarkis, San Diego, CA (US); Sourjya Dutta, San Diego, CA (US); Hui Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 278 days.

(21) Appl. No.: 18/559,766

(22) PCT Filed: Jul. 30, 2021

(86) PCT No.: PCT/CN2021/109588
§ 371 (c)(1),
(2) Date: Nov. 8, 2023

(87) PCT Pub. No.: WO2023/004746
PCT Pub. Date: Feb. 2, 2023

(65) Prior Publication Data

US 2024/0381320 A1 Nov. 14, 2024

(51) Int. Cl.
*H04W 28/02* (2009.01)
*H04W 72/02* (2009.01)
(Continued)

(52) U.S. Cl.
CPC ........... *H04W 72/51* (2023.01); *H04W 72/02* (2013.01); *H04W 72/23* (2023.01); *H04W 72/25* (2023.01);
(Continued)

(58) Field of Classification Search
CPC ............. H04L 25/0204; H04L 25/0212; H04L 25/025; H04W 84/18; H04W 72/1263; H04W 76/28; H04W 72/535
See application file for complete search history.

(56) References Cited

U.S. PATENT DOCUMENTS

2016/0380892 A1 12/2016 Mahadevan et al.
2020/0037343 A1 1/2020 He et al.
(Continued)

FOREIGN PATENT DOCUMENTS

CN 110431893 A 11/2019
CN 112187417 A 1/2021

OTHER PUBLICATIONS

Lenovo, et al., "Discussion on Inter-UE Coordination for Mode 2 Enhancements", 3GPP TSG RAN WG1 #105-e, R1-2104870, 3rd Generation Partnership Project (3GPP), Mobile Competence Centre, 650, Route Des Lucioles, F-06921, Sophia-Antipolis Cedex, France, vol. RAN WG1, No. e-Meeting, May 10, 2021-May 27, 2021, May 12, 2021, 9 Pages, XP052011091, The Whole Document.

(Continued)

*Primary Examiner* — Phuoc H Doan
(74) *Attorney, Agent, or Firm* — Holland & Hart LLP

(57) ABSTRACT

Methods, systems, and devices for wireless communications are described. To improve sidelink reservation schemes, a first user equipment (UE) may receive, from a second UE, a coordination message indicating a set of resources associated with sidelink communications and a preference of the second UE for one or more subsets of the set of resources. The first UE may transmit the sidelink communications using one or more resources of the set of resources based on the preference of the second UE for the one or more subsets of the set of resources. In some examples, the one or more resources may be selected from candidate resources within (Continued)

Receive, from a second UE, a coordination message indicating a preference of the second UE for one or more sets of resources associated with sidelink communications — 905

Determine a resource selection window based at least in part on remaining packet delay budget associated with the first UE — 910

Determine a set of candidate resources in the resource selection window for resource selection by the first UE based at least in part on the preference of the second UE for the one or more sets of resources — 915

Perform a resource selection procedure in the resource selection window to select a set of resources from the set of candidate resources — 920

Transmit, by the first UE, a sidelink message using the set of resources — 925

900 a resource selection window of the first UE. Additionally, or alternatively, the candidate resources may be based on the preference of the second UE.

24 Claims, 12 Drawing Sheets

(51) Int. Cl.

| | |
|---|---|
| ***H04W 72/23*** | (2023.01) |
| ***H04W 72/25*** | (2023.01) |
| ***H04W 72/51*** | (2023.01) |
| ***H04W 72/53*** | (2023.01) |
| ***H04W 72/542*** | (2023.01) |
| ***H04W 72/56*** | (2023.01) |

(52) U.S. Cl.
CPC ......... *H04W 72/53* (2023.01); *H04W 72/542* (2023.01); *H04W 72/56* (2023.01)

(56) References Cited

U.S. PATENT DOCUMENTS

| | | | | |
|---|---|---|---|---|
| 2020/0314916 | A1 | 10/2020 | Park et al. | |
| 2021/0360605 | A1 | 11/2021 | Hassan et al. | |
| 2022/0014332 | A1 | 1/2022 | Wang | |
| 2022/0077993 | A1 | 3/2022 | Hong et al. | |
| 2022/0095280 | A1 | 3/2022 | Farag et al. | |
| 2022/0167310 | A1 | 5/2022 | Wang et al. | |
| 2022/0190163 | A1 | 6/2022 | Sakai et al. | |
| 2023/0032706 | A1 | 2/2023 | Wu | |
| 2023/0180215 | A1* | 6/2023 | Du | H04W 76/28 370/329 |

OTHER PUBLICATIONS

LG Electronics: "Discussion on Feasibility and Benefits for Mode 2 Enhancements", 3GPP TSG RAN WG1 Meeting #104-e, R1-2101786, (Revision of R1-2100518), 3rd Generation Partnership Project (3GPP), Mobile Competence Centre, 650, Route Des Lucioles, F-06921, Sophia-Antipolis Cedex, France, vol. Ran WG1, No. e-Meeting, Jan. 25, 2021-Feb. 5 2021, Jan. 26, 2021, 28 Pages, XP051975888, pp. 1-20.

Supplementary European Search Report—EP21951342—Search Authority—The Hague—Feb. 19, 2025.

Xiaomi: "Discussion on inter-UE Coordination", 3GPP TSG RAN WG1 #105-e, R1-2105545, 3rd Generation Partnership Project (3GPP), Mobile Competence Centre, 650, Route Des Lucioles, F-06921, Sophia-Antipolis Cedex, France, vol. RAN WG1, No. e-Meeting, May 10, 2021-May 27, 2021, May 11, 2021, 12 Pages, XP052006401, The Whole Document.

International Search Report and Written Opinion—PCT/CN2021/109588—ISA/EPO—Apr. 6, 2022.

LG Electronics: "Discussion on Resource Allocation for Mode 2", 3GPP Draft, 3GPP TSG RAN WG1 #98, R1-1910779, Chongqing, China, Oct. 14-20, 2019, pp. 1-14, Chapters 1-3.

LG Electronics: "Discussion on Resource Allocation for Mode 2", 3GPP TSG RAN WG1 #99, R1-1912588, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019, XP051823495, pp. 1-16.

Xiaomi: "Unicast Mode V2X Communication Procedures for Ranging and Sidelink Positioning", 3GPP Tsg-Ct WG1 Meeting #141e, C1-233616, Online Apr. 17-21, 2023, 3 Pages.

Xiaomi: "Unicast Mode V2X Communication Procedures for Ranging and Sidelink Positioning", 3GPP TSG-CT WG1 Meeting #142, C1-234010, Bratislava May 22-26, 2023, 2 Pages.

* cited by examiner

INTER-UE COORDINATION INFORMATION-BASED RESOURCE ALLOCATION

CROSS REFERENCE

The present Application is a 371 national stage filing of International PCT Application No. PCT/CN2021/109588 by WU et al. entitled "INTER-UE COORDINATION INFORMATION-BASED RESOURCE ALLOCATION," filed Jul. 30, 2021, which is assigned to the assignee hereof, and which is expressly incorporated by reference in its entirety herein.

FIELD OF TECHNOLOGY

The following relates to wireless communications, including inter-UE coordination information-based resource allocation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support sidelink communications between UEs. In some examples, a UE may receive sidelink control information (SCI) from one or more other UEs to determine which sidelink resources of a set of sidelink resources are reserved by the one or more other UEs based on reservation information included in the SCI. In some examples, the UE may transmit SCI to the one or more other UEs to reserve sidelink resources of the set for its own sidelink transmissions. In some cases, however, the UE may not receive one or more SCI transmissions and may thus be unaware of corresponding sidelink resource reservations. As a result, the UE may reserve and transmit on sidelink resources that are reserved by other UEs, thereby causing collisions and reducing the reliability of sidelink communications.

SUMMARY

The described techniques relate to improved methods, systems, devices, and apparatuses that support inter-UE coordination information-based resource allocation. Generally, the described techniques provide for improving sidelink resource reservation and selection schemes by indicating UE preferences for sidelink resources. For example, a first UE may receive an inter-UE coordination message from one or more other helping UEs. The helping UE may monitor a first set of sidelink resources for sidelink control information (SCI) to determine which sidelink resources of a second set of sidelink resources are available and which sidelink resources are reserved (e.g., unavailable). Based on the monitoring, the first UE may determine whether a given sidelink resource of the second set of sidelink resources is preferred or non-preferred and may transmit an indication of the preference or preferences to the first UE. For example, if the helping UE determines that a sidelink resource is available (e.g., based on a reference signal received power (RSRP) of an associated SCI message satisfying a threshold, based on a priority level associated with the sidelink resource satisfying a threshold, or both), the helping UE may determine that the sidelink resource is a preferred sidelink resource for transmitting a sidelink message at the first UE. Alternatively, the helping UE may determine that the sidelink resource is a non-preferred sidelink resource for transmitting the sidelink message at the first UE if the sidelink resource is reserved by one or more other UEs.

The first UE may identify a number of candidate resources of a resource selection window for sidelink transmission based on the preferences indicated by the helping UE and further based on performing a sensing procedure similarly to the procedure used by the helping UE to identify preferred or non-preferred resources. For example, the preference may indicate which resources are non-preferred and the transmitting UE may designate the remaining resources of the window as candidate resources (e.g., may exclude the non-preferred resources from the set of candidate resources). In some examples, the preference may indicate which resources are preferred and the transmitting UE may designate the preferred resources of the window as candidate resources (e.g., may exclude the remaining resources from the set of candidate resources). In some examples, the transmitting UE may adjust the resource selection window based on the indicated preference. For example, the transmitting UE may determine the window such that it at least partially includes preferred resources of the helping UE.

The transmitting UE may select one or more resources from the set of candidate resources for sidelink transmissions. For example, the set of candidate resources may include preferred resources indicated by the helping UE and resources sensed by the transmitting UE as available (e.g., based on RSRP, priority, or the like) and the transmitting UE may select one or more of the candidate resources for transmitting a sidelink message.

In some examples, a UE may perform resource selection based on a resource selection window by selecting resources within the resource selection window, which may be referred to as candidate resources, and transmit a sidelink message using the selected set of resources. For instance, a UE may receive a coordination message from a second UE which indicates preferred or non-preferred resources of the second UE that are within a future time window. The UE may determine a resource selection window based on a packet delay budget (e.g., a remaining packet delay budget) associated with a sidelink message to be transmitted by the UE and may determine candidate resources within the resource selection window based on the preferred or non-preferred resources of the second UE, as indicated by the second UE.

In some cases, the UE may determine the resource selection window such that at least one resource indicated by the second UE is included in the resource selection window. For instance, the UE may adjust the resource selection window such that at least one resource that is within the future time window indicated by the second UE is included in the resource selection window. In such cases, the resource selection window and the future time window may partially or wholly overlap in time.

When determining the resource selection window, the UE may exclude the non-preferred resources non-preferred resources indicated as a preference of the second UE from a total set of candidate resources within the resource selection window. The UE may perform sidelink sensing on the remaining resources within the resource selection window (e.g., the total set of candidate resources excluding the non-preferred resources) to identify resources that are available for use by the UE for transmitting the sidelink message. In some cases, the second UE may indicate resources that are preferred by the second UE as part of the preference of the second UE (e.g., which may be indicated or included in the coordinate message), and the UE may determine non-preferred resources based on the preference indication and exclude the preferred resources from the resource selection window.

Additionally, or alternatively, the UE may determine candidate resource within a resource selection window by determining a total set of resources (e.g., all resources) within the resource selection window and perform a sidelink sensing procedure to identify which of the total set of resources are available. Of the resources that are identified as available the UE may determine which of the identified resources are indicated as preferred by the second UE as part of the preference of the second UE and may select resources for transmitting the sidelink message. That is, the UE may select from resources that are identified as available and are indicated as preferred by the second UE within the resource selection window.

A method for wireless communication at a first UE is described. The method may include receiving, from a second UE, a coordination message indicating a preference of the second UE for one or more sets of resources associated with sidelink communications, determining a resource selection window based on remaining packet delay budget associated with the first UE, determining a set of candidate resources in the resource selection window for resource selection by the first UE based on the preference of the second UE for the one or more sets of resources, performing a resource selection procedure in the resource selection window to select a set of resources from the set of candidate resources, and transmitting, by the first UE, a sidelink message using the set of resources.

An apparatus for wireless communication at a first UE is described. The apparatus may include a processor, memory coupled with the processor, and instructions stored in the memory. The instructions may be executable by the processor to cause the apparatus to receive, from a second UE, a coordination message indicating a preference of the second UE for one or more sets of resources associated with sidelink communications, determine a resource selection window based on remaining packet delay budget associated with the first UE, determine a set of candidate resources in the resource selection window for resource selection by the first UE based on the preference of the second UE for the one or more sets of resources, perform a resource selection procedure in the resource selection window to select a set of resources from the set of candidate resources, and transmit, by the first UE, a sidelink message using the set of resources.

Another apparatus for wireless communication at a first UE is described. The apparatus may include means for receiving, from a second UE, a coordination message indicating a preference of the second UE for one or more sets of resources associated with sidelink communications, means for determining a resource selection window based on remaining packet delay budget associated with the first UE, means for determining a set of candidate resources in the resource selection window for resource selection by the first UE based on the preference of the second UE for the one or more sets of resources, means for performing a resource selection procedure in the resource selection window to select a set of resources from the set of candidate resources, and means for transmitting, by the first UE, a sidelink message using the set of resources.

A non-transitory computer-readable medium storing code for wireless communication at a first UE is described. The code may include instructions executable by a processor to receive, from a second UE, a coordination message indicating a preference of the second UE for one or more sets of resources associated with sidelink communications, determine a resource selection window based on remaining packet delay budget associated with the first UE, determine a set of candidate resources in the resource selection window for resource selection by the first UE based on the preference of the second UE for the one or more sets of resources, perform a resource selection procedure in the resource selection window to select a set of resources from the set of candidate resources, and transmit, by the first UE, a sidelink message using the set of resources.

In some examples of the method, apparatuses, and non-transitory computer-readable medium described herein, determining the resource selection window may include operations, features, means, or instructions for determining the resource selection window based on the preference of the second UE for the one or more sets of resources such that at least one resource of the one or more sets of resources indicated in the coordination message may be included in the resource selection window.

In some examples of the method, apparatuses, and non-transitory computer-readable medium described herein, determining the set of candidate resources in the resource selection window may include operations, features, means, or instructions for determining non-preferred resources in the resource selection window based on the preference of the second UE, determining a total set of candidate resources in the resource selection window, the total set of candidate resources being within the resource selection window with the non-preferred resources excluded, and performing a sidelink sensing procedure to identify available resources in the total set of candidate resources, where the set of candidate resources includes the identified available resources.

Some examples of the method, apparatuses, and non-transitory computer-readable medium described herein may further include operations, features, means, or instructions for receiving an indication of one or more non-preferred resources of the second UE within a time window, where the resource selection window at least partially overlaps in time with the time window and the non-preferred resources may be determined based on the indication of the one or more non-preferred resources of the second UE.

In some examples of the method, apparatuses, and non-transitory computer-readable medium described herein, the coordination message includes an indication of one or more preferred resources of the second UE within a time window, where the resource selection window excludes the one or more preferred resources of the second UE.

In some examples of the method, apparatuses, and non-transitory computer-readable medium described herein, determining the set of candidate resources in the resource selection window may include operations, features, means, or instructions for determining a total set of candidate resources in the resource selection window, the total set of candidate resources being all resources in the resource selection window, performing a sidelink sensing procedure to identify available resources in the total set of candidate resources, and determining a set of preferred resources in the resource selection window based on the preference of the second UE, where the set of candidate resources includes resources that may be identified as available resources and in the set of preferred resources.

Some examples of the method, apparatuses, and non-transitory computer-readable medium described herein may further include operations, features, means, or instructions for performing a sidelink sensing procedure to identify available resources in the resource selection window, where the set of candidate resources includes the identified available resources.

In some examples of the method, apparatuses, and non-transitory computer-readable medium described herein, performing the sidelink sensing procedure may include operations, features, means, or instructions for decoding SCI from one or more other UEs and identifying a first subset of resources within the resource selection window that may be reserved by the one or more other UEs and a second subset of resources within the resource selection window including unscheduled resources based on decoding the SCI.

Some examples of the method, apparatuses, and non-transitory computer-readable medium described herein may further include operations, features, means, or instructions for measuring a received power associated with each resource of the first subset of resources and determining the set of candidate resources as resources of the first subset of resources that satisfy a received power threshold based on the measuring.

Some examples of the method, apparatuses, and non-transitory computer-readable medium described herein may further include operations, features, means, or instructions for determining that a first number of candidate resources may be below a threshold number of candidate resources, the first number of candidate resources including a number of the set of candidate resources including the resources that satisfy the received power threshold and adjusting the received power threshold based on the first number of candidate resources being below the threshold number of candidate resources.

Some examples of the method, apparatuses, and non-transitory computer-readable medium described herein may further include operations, features, means, or instructions for transmitting the adjusted received power threshold to the second UE.

Some examples of the method, apparatuses, and non-transitory computer-readable medium described herein may further include operations, features, means, or instructions for receiving an indication of a threshold from the second UE, where the indicated preference of the second UE for the one or more sets of resources may be based on the threshold.

Some examples of the method, apparatuses, and non-transitory computer-readable medium described herein may further include operations, features, means, or instructions for determining the set of candidate resources based on the threshold.

In some examples of the method, apparatuses, and non-transitory computer-readable medium described herein, the indication may be received in the coordination message.

In some examples of the method, apparatuses, and non-transitory computer-readable medium described herein, the coordination message includes a bitmap that indicates the preference of the second UE, where each bit of the bitmap indicates an availability of a respective resource within a time window.

In some examples of the method, apparatuses, and non-transitory computer-readable medium described herein, the resource selection window at least partially overlaps the time window.

BRIEF DESCRIPTION OF THE DRAWINGS

FIG. 4 illustrates an example of a process flow that supports inter-UE coordination information-based resource allocation in accordance with aspects of the present disclosure.

DETAILED DESCRIPTION

Figure 1:
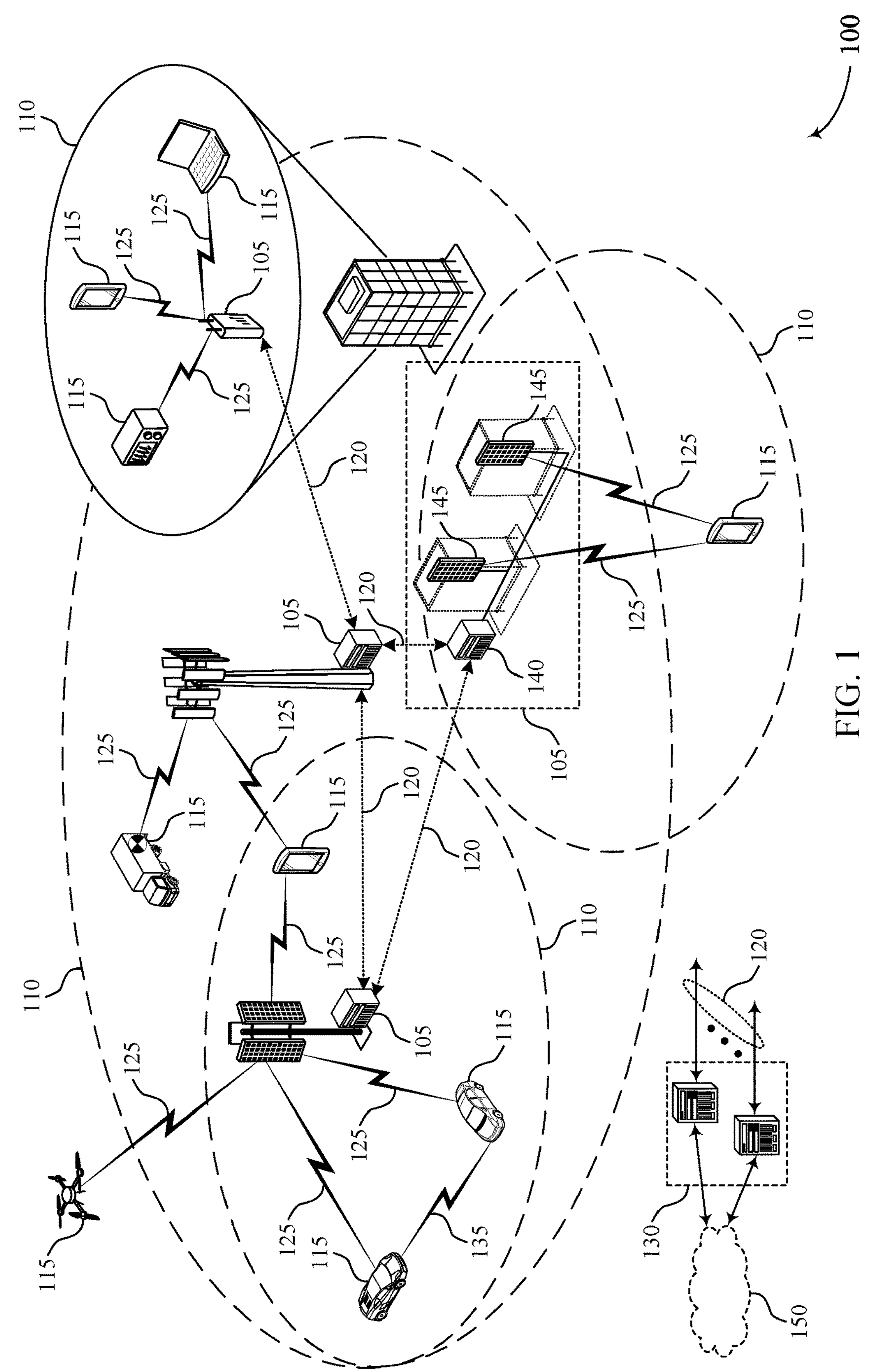
FIG. 1 illustrates an example of a wireless communications system that supports inter-UE coordination information-based resource allocation in accordance with aspects of the present disclosure.

In some wireless communications systems, a user equipment (UE) such as a vehicle UE operating in a V2X communications system, for example, may be configured to transmit and receive sidelink communications. The UE may be configured with one or more resource allocation modes to coordinate sidelink communications with other UEs 115 (e.g., over D2D communication links 135, over PC5 links). For example, the UE may be configurable to operate according a Mode 1 resource allocation mode and/or a Mode 2 resource allocation mode. While operating in Mode 1, the UE may communicate using resources allocated or coordinated by a base station. For example, during Mode 1 operation, the base station may manage sidelink resource allocation over a sidelink network.

While operating in Mode 2, the UE may follow contention-based access procedures in which the various UEs may reserve sidelink resources of the sidelink network. For example, during Mode 2 operation, a UE may monitor the sidelink network to determine if other UEs are attempting to transmit over the sidelink network. For instance, the UE may decode one or more reservation messages (e.g., sidelink control channel transmissions such as SCI messages, SCI-1 messages, SCI-2 messages, request-to-send-messages, or some other sidelink control channel transmissions) and may determine which sidelink resources are reserved for other sidelink communications and which sidelink resources are available for sidelink communications based on the reservation messages. In some examples, the UE may determine whether a sidelink resource is reserved based on measuring an RSRP of an associated reservation message. In some other examples, the UE may determine whether a sidelink resource is reserved based on a priority level of an associated reservation message. In some cases, the UE may determine which sidelink resources are available for sidelink communications based on reservation messages decoded during a sensing window, where the sensing window corresponds to some duration of time prior to the arrival of a packet of information. In some examples, the packet arrival may trigger the UE to determine which sidelink resources are available and to reserve sidelink resources (e.g., via random selection of the available sidelink resources).

In some examples, UEs may be configured with one or more sidelink resource pools from which to select and reserve sidelink resources (e.g., during Mode 2 operation). In some cases, sidelink resource pools may include transmit sidelink resource pools (e.g., sets of sidelink resources over which the UE may transmit sidelink messages) and receive sidelink resource pools (e.g., sets of sidelink resources over which the UE may receive sidelink messages). The sidelink resource pools may be configured for Mode 1 communications or for Mode 2 communications. In some examples, a sidelink resource pool configuration for a sidelink resource pool may include a physical sidelink shared channel (PSSCH) configuration, a physical sidelink control channel (PSCCH) configuration, physical sidelink feedback channel (PSFCH) configuration, a quantity of subchannels in the sidelink resource pool, a subchannel size, a starting resource block of the sidelink resource pool, a modulation and coding scheme (MCS) associated with the sidelink resource pool, a sensing configuration, a power control configuration, a constant bit rate (CBR), or a combination thereof.

Various aspects of the described techniques support UE preference indication for sidelink resources to improve sidelink resource reservation and selections schemes (e.g., during Mode 2 operation), increase reliability, and reduce sidelink collisions, among other benefits. For example, a first UE may monitor a sidelink channel for SCI during a sensing window to determine which sidelink resources of a sidelink resource pool are available and which sidelink resources are reserved (e.g., unavailable). Based on the monitoring, the first UE may determine whether a given sidelink resource of the sidelink resource pool is preferred or non-preferred. For example, the first UE may determine that a sidelink resource is a preferred sidelink resource for receiving a sidelink message at the first UE sidelink resource is available (e.g., based on an RSRP of an associated SCI message, based on a priority level associated with the sidelink resource, or both). Alternatively, the first UE may determine that the sidelink resource is a non-preferred sidelink resource for receiving the sidelink message at the first UE if the sidelink resource is reserved (e.g., based on the RSRP, based on the priority level, or both).

The first UE may generate an inter-UE coordination message, which in some examples may include an indication (e.g., a bitmap) for the sidelink resource pool that indicates preferences of the first UE for the sidelink resources of the sidelink resource pool. In some examples, each bit of the bitmap may correspond to a respective sidelink resource of the sidelink resource pool and may indicate a respective preference (e.g., preferred or non-preferred) for the respective sidelink resource. In some examples, the indication may include a set of preferred resources, or may include a set of non-preferred resources, or both. The first UE may transmit a coordination message to a second UE that includes the indication. In some examples, the second UE may receive a number of inter-UE coordination messages indicating resource preferences for each of a number of helping UE (e.g., including the first UE).

The second UE may, additionally or alternatively, identify a set of available resources by performing a second sensing procedure. For example, the second UE may monitor a sidelink channel for SCI during a sensing window to determine which sidelink resources of a sidelink resource pool are available and which sidelink resources are reserved (e.g., unavailable). Based on the number of preference indications (e.g., one or more) and the second sensing procedure, the second UE may identify a set of candidate resources for transmitting sidelink communication. Based on the preferences indicated, the second UE may select one or more candidate sidelink resources of the sidelink resource pool and may transmit one or more sidelink messages (e.g., to the first UE or to one or more other UE) using the selected one or more candidate sidelink resources. Due to potentially different local interference at each of the helping UE and the second UE, available resources as sensed by the helping UEs, or by the helping UEs and the second UE itself, may be differ and thus selecting resources for sidelink communications based on a self-sensing procedure and further based on the preference indications from the number of helping UE may decrease the likelihood of a collision between the sidelink communications of the second UE and sidelink communications of other UE.

In some examples, the second UE may receive the number of preference indications and may determine a resource selection window for selecting candidate resources independently or based on the indicated preferences. For example, the second UE may receive a preference indication that indicates a set of preferred resources. In some such examples, the second UE may determine a resource selection window that includes at least a portion of the indicated resources and may include the indicated resources of the resource selection window in the set of candidate resources. In some other examples, the second UE may determine the resource selection window and if there are resources indicated as preferred in the resource selection window, may include them in the set of candidate resources. In some examples, the preference indication may indicate a set of non-preferred resources. In such examples, the second UE may select a resource selection window and may exclude the indicated resources from the set of candidate resources of the resource selection window. The set of candidate resources may also include resources in the resource selection window identified as suitable for sidelink communications based on the second UE's sensing procedure.

Aspects of the disclosure are initially described in the context of wireless communications systems. *DESCRIBE NARRATIVE DIAGRAMS* Aspects of the disclosure are further illustrated by and described with reference to apparatus diagrams, system diagrams, and flowcharts that relate to inter-UE coordination information-based resource allocation.

FIG. 1 illustrates an example of a wireless communications system 100 that supports inter-UE coordination information-based resource allocation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may be an example of a sidelink network. Here, the sidelink network may support one or more resource allocation modes to coordinate sidelink communications between UEs 115 (e.g., over D2D communication links 135, over PC5 links). For example, the sidelink network may be configurable to operate according a Mode 1 resource allocation mode and/or a Mode 2 resource allocation mode. While operating in Mode 1, the sidelink network (e.g., sidelink communications over the sidelink network) may be managed (e.g., coordinated) by a base station 105. For example, during Mode 1 operation, the base station 105 may manage sidelink resource allocation over the sidelink network.

While operating in Mode 2, the sidelink network may not be managed or coordinated by the base station 105. Without coordination or management of sidelink resources of the sidelink network during the Mode 2 operation, UEs 115 may follow contention-based access procedures in which the various UEs 115 may reserve sidelink resources of the sidelink network. For example, during Mode 2 operation, a UE 115 may monitor the sidelink network to determine if other UEs 115 are attempting to transmit over the sidelink network. For instance, the UE 115 may decode one or more reservation messages (e.g., sidelink control channel transmissions such as SCI messages, SCI-1 messages, SCI-2 messages, request-to-send-messages, or some other sidelink control channel transmissions) and may determine which sidelink resources are reserved for other sidelink communications and which sidelink resources are available for sidelink communications based on the reservation messages. In some examples, the UE 115 may determine whether a sidelink resource is reserved based on measuring an RSRP of an associated reservation message. In some other examples, the UE 115 may determine whether a sidelink resource is reserved based on a priority level of an associated reservation message. In some cases, the UE 115 may determine which sidelink resources are available for sidelink communications based on reservation messages decoded during a sensing window, where the sensing window corresponds to some duration of time prior to the arrival of a packet of information. In some examples, the packet arrival may trigger the UE 115 to determine which sidelink resources are available and to reserve sidelink resources (e.g., via random selection of the available sidelink resources).

In some examples, UEs 115 may be configured with one or more sidelink resource pools from which to select and reserve sidelink resources (e.g., during Mode 2 operation). In some cases, sidelink resource pools may include transmit sidelink resource pools (e.g., sets of sidelink resources over which the UE 115 may transmit sidelink messages) and receive sidelink resource pools (e.g., sets of sidelink resources over which the UE 115 may receive sidelink messages). The sidelink resource pools may be configured for Mode 1 communications or for Mode 2 communications. In some examples, a sidelink resource pool configuration for a sidelink resource pool may include a physical sidelink shared channel (PSSCH) configuration, a physical sidelink control channel (PSCCH) configuration, physical sidelink feedback channel (PSFCH) configuration, a quantity of subchannels in the sidelink resource pool, a subchannel size, a starting resource block of the sidelink resource pool, a modulation and coding scheme (MCS) associated with the sidelink resource pool, a sensing configuration, a power control configuration, a constant bit rate (CBR), or a combination thereof.

Various aspects of the described techniques support UE preference indication for sidelink resources to improve sidelink resource reservation and selections schemes (e.g., during Mode 2 operation), increase reliability, and reduce sidelink collisions, among other benefits. For example, a first UE 115 may monitor a sidelink channel for SCI during a sensing window to determine which sidelink resources of a sidelink resource pool are available and which sidelink resources are reserved (e.g., unavailable). Based on the monitoring, the first UE 115 may determine whether a given sidelink resource of the sidelink resource pool is preferred or non-preferred. For example, the first UE 115 may determine that a sidelink resource is a preferred sidelink resource for receiving a sidelink message at the first UE 115 sidelink resource is available (e.g., based on an RSRP of an associated SCI message, based on a priority level associated with the sidelink resource, or both). Alternatively, the first UE 115 may determine that the sidelink resource is a non-preferred sidelink resource for receiving the sidelink message at the first UE 115 if the sidelink resource is reserved (e.g., based on the RSRP, based on the priority level, or both).

The first UE 115 may generate an inter-UE coordination message, which in some examples may include an indication (e.g., a bitmap) for the sidelink resource pool that indicates preferences of the first UE 115 for the sidelink resources of the sidelink resource pool. In some examples, each bit of the bitmap may correspond to a respective sidelink resource of the sidelink resource pool and may indicate a respective preference (e.g., preferred or non-preferred) for the respective sidelink resource. In some examples, the indication may include a set of preferred resources, or may include a set of non-preferred resources, or both. The first UE 115 may transmit a coordination message to a second UE 115 that includes the indication. In some examples, the second UE 115 may receive a number of inter-UE coordination messages indicating resource preferences for each of a number of helping UE 115 (e.g., including the first UE 115).

The second UE 115 may, additionally or alternatively, identify a set of available resources by performing a second sensing procedure. For example, the second UE 115 may monitor a sidelink channel for SCI during a sensing window to determine which sidelink resources of a sidelink resource pool are available and which sidelink resources are reserved (e.g., unavailable). Based on the number of preference indications (e.g., one or more) and the second sensing procedure, the second UE 115 may identify a set of candidate resources for transmitting sidelink communication. Based on the preferences indicated, the second UE 115 may select one or more candidate sidelink resources of the sidelink resource pool and may transmit one or more sidelink messages (e.g., to the first UE 115 or to one or more other UE 115) using the selected one or more candidate sidelink resources. Due to potentially different local interference at each of the helping UE 115 and the second UE 115, available resources as sensed by the helping UEs 115, or by the helping UEs and the second UE 115 itself, may be differ and thus selecting resources for sidelink communications based on a self-sensing procedure and further based on the preference indications from the number of helping UE may decrease the likelihood of a collision between the sidelink communications of the second UE 115 and sidelink communications of other UE 115.

Figure 2:
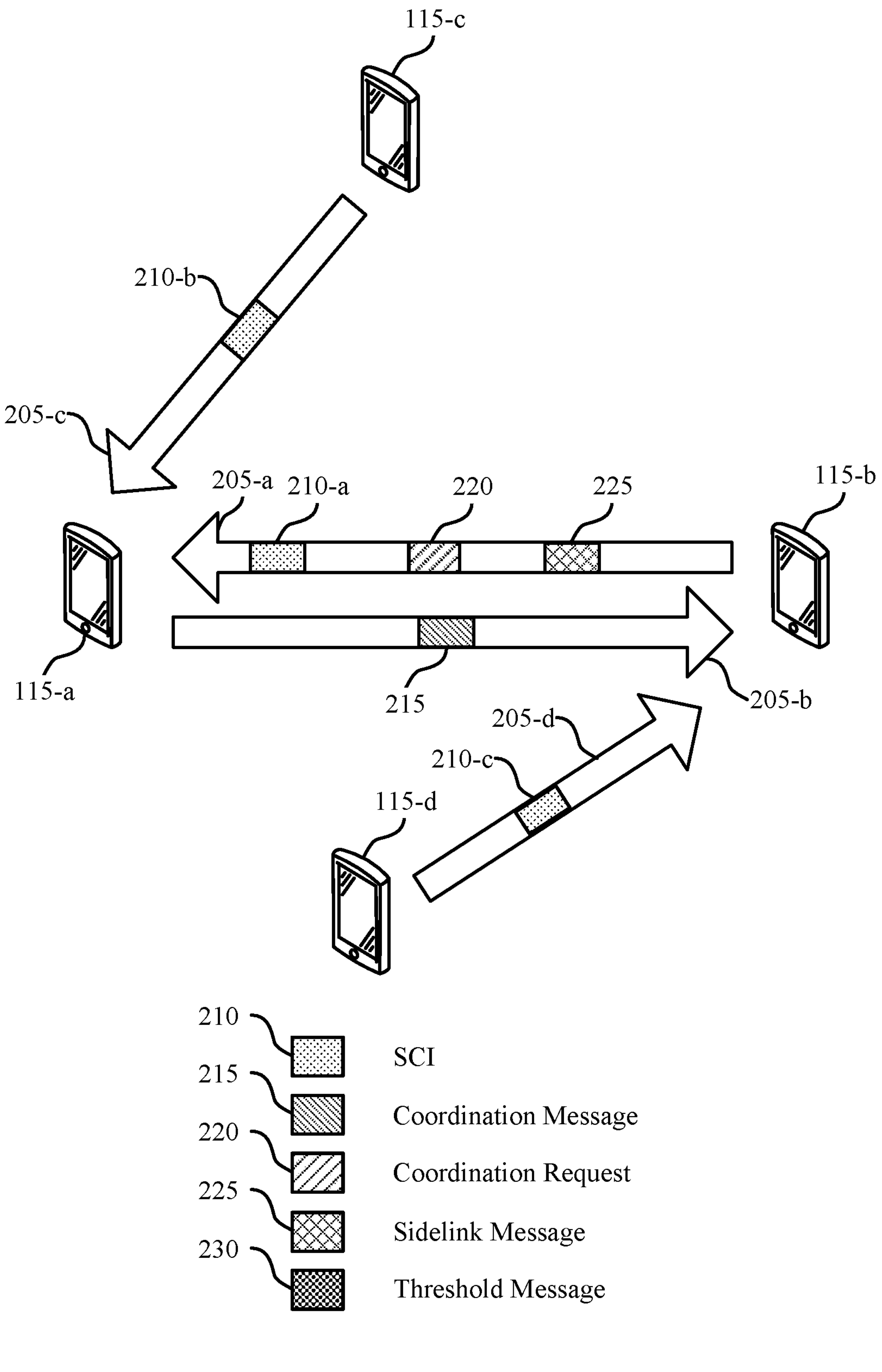
FIG. 2 illustrates an example of a wireless communications system that supports inter-UE coordination information-based resource allocation in accordance with aspects of the present disclosure.

FIG. 2 illustrates an example of a wireless communications system 200 that supports inter-UE coordination information-based resource allocation in accordance with aspects of the present disclosure. The wireless communications system 200 may implement aspects of the wireless communications system 100 or may be implemented by aspects of the wireless communications system 100. For example, the wireless communications system 200 may include a UE 115-*a*, a UE 115-*b*, a ULE 115-*c*, and a UE 115-*d* which may be examples of a UE 115 described with reference to FIG. 1. In some examples, the wireless communications system 200 may support multiple radio access technologies including 4G systems such as LTE systems, LTE-A systems, or LTE-A Pro systems, and 5G systems which may be referred to as NR systems. The wireless communications system 200 may support sidelink resource preference indications to support improvements to reliability, sidelink resource selection and reservation, resource usage, data rates, spectral efficiency, latency, coordination between devices, power consumption, battery life, and processing capability among other benefits.

The wireless communications system 200 may support sidelink communications between the UE 115-*a* and the UE 115-*b*, between the UE 115-*a* and the UE 115-*c*, and between the UE 115-*b* and the UE 115-*d*. For example, the UE 115-*b* may transmit and the UE 115-*a* may receive sidelink communications over a sidelink 205-*a*, and the UE 115-*a* may transmit and the UE 115-*b* may receive sidelink communications over a sidelink 205-*b*. Additionally, the UE 115-*c* may transmit and the UE 115-*a* may receive sidelink communications over a sidelink 205-*c* and the UE 115-*d* may transmit and the UE 115-*b* may receive sidelink communications over a sidelink 205-*d*. In some cases, the sidelinks 205 may be respective examples of D2D communication links 135 as described with reference to FIG. 1.

The wireless communications system 200 may be configured to operate according to a Mode 2 resource allocation mode. For example, the UEs 115 may monitor respective sidelinks 205 for SCI 210 (e.g., during a sensing window) in order to determine which sidelink resources are available and which sidelink resources are reserved (e.g., unavailable). For instance, a UE 115 may transmit SCI 210 to one or more UEs 115 to reserve one or more available sidelink resources. Accordingly, other UEs 115 may receive and decode the SCI 210 to determine which sidelink resources are reserved by the SCI 210 (e.g., and by the UE 115). In some cases, the sidelink resources reserved by SCI 210 may be randomly selected from a set of available sidelink resources by the UE 115 that transmits the SCI 210. For example, a UE 115 may determine which sidelink resources are available based on SCI 210 decoded by the UE 115 during a sensing window and may randomly select one or more of the available sidelink resources to reserve, via SCI 210, for transmission of one or more sidelink messages 225.

In some cases, however, the UE 115 may fail to decode one or more SCIs 210 and may subsequently transmit SCI 210 that reserves sidelink resources that are reserved by another UE 115 (e.g., by the one or more SCIs 210). For example, the UE 115-*b* may fail to decode SCI 210-*b* transmitted by the UE 115-*c* (e.g., due to being outside of a sidelink communication range of the UE 115-*c*, due to poor signal quality of the SCI 210-*b* at the UE 115-*b*, etc.), which may result in the UE 115-*b* failing to determine that the sidelink resources reserved by SCI 210-*b* are reserved. In some cases, the UE 115-*b* may select one or more of the reserved sidelink resources and may transmit SCI 210-*a* to reserve the selected sidelink resources, thus resulting in conflicting reservations. Consequently, collisions and interference between sidelink messages 225 transmitted over the conflicting sidelink resources (e.g., by the UE 115-*b* and the UE 115-*c*) may suffer reduced reliability, and in some cases, may fail to be properly decoded.

In order to increase sidelink communication reliability and sidelink resource selection robustness, the UE 115-*a* may be configured to indicate its preferences for sidelink resources, which may be used by another UE 115 (e.g., UE 115-*b*) in selecting sidelink resources. For example, the UE 115-*a* may monitor a first set of sidelink resources (e.g., corresponding to a sensing window) for SCI 210 from one or more UEs 115 (e.g., UE 115-*b*, UE 115-*c*, one or more other UEs 115 (not shown), or a combination thereof). In some examples, the UE 115-*a* may receive and decode the SCI 210 from the one or more UEs 115 (e.g., SCI 210-*a*, SCI 210-*b*, other SCI 210, or a combination thereof) and may determine corresponding sidelink resource reservations of a second set of sidelink resources. Based on the SCI 210, the UE 115-*a* may determine which sidelink resources of the second set of sidelink resources are available and which sidelink resources of the second set of sidelink resources are reserved. In some cases, the UE 115-*a* may not receive or decode SCI 210 from any UE 115, in which case the UE 115-*a* may determine that each of the sidelink resources of the second set of sidelink resources are available.

Based on the availability determination, the UE 115-*a* may determine a preference of the UE 115-*a* for one or more of the sidelink resources of the second set of sidelink resources. The preference of the UE 115-*a* for a sidelink resource may indicate whether the sidelink resource is a preferred or a non-preferred sidelink resource for transmitting sidelink messages by the UE 115-*b*. In some examples, the UE 115-*a* may determine that a sidelink resource is preferred if the sidelink resource is available and may determine that a sidelink resource is non-preferred if the sidelink resource is reserved. In some cases, if the preference of the UE 115-*a* is associated with receiving a sidelink message 225 from the UE 115-*b* and the UE 115-*a* determines that a sidelink resource is reserved by the UE 115-*b* (e.g., via SCI 210-*a*), the UE 115-*a* may determine that the sidelink resource is preferred.

The UE 115-*a* may transmit a coordination message 215 to the UE 115-*b* that indicates its preferences for one or more sidelink resources of the second set of sidelink resources. For example, the UE 115-*a* may determine its preference for one or more of (e.g., each) sidelink resource of the second set of sidelink resource according to the techniques described herein and may generate an indication (e.g., a bitmap) including a respective preference of the UE 115-*a* for the one or more sidelink resources of the second set of sidelink resources. The indication may include a preference for each of the one or more sidelink resources and each preference may indicate whether a corresponding sidelink resource is preferred or non-preferred. In some examples, the indication may be associated with preferred sidelink resources or non-preferred sidelink resources. For example, the indication may include a set of preferred sidelink resources. Alternatively, the bitmap may include a set of non-preferred sidelink resources. In some examples, the indication may include a preference for each sidelink resource of the set of sidelink resources and a value of a bit (e.g., a '0' or a '1') in the indication may indicate whether the sidelink resource is preferred or non-preferred.

The coordination message 215 may include the indication generated by the UE 115-*a*, which may indicate the preferences of the UE 115-*a* for the one or more sidelink resources of the second set of sidelink resources. The coordination message 215 may additionally include an indication of the priority threshold (e.g., the selected priority threshold) used to determine the preferences of the UE 115-*a*, an indication of the RSRP threshold used to determine the preferences of the UE 115-*a* (e.g., the selected threshold RSRP), an indication that the indication (e.g., the preferences of the UE 115-*a*) indicates preferred sidelink resources, an indication that the indication (e.g., the preferences of the UE 115-*a*) indicates non-preferred sidelink resources, an indication of which bit value indicates a preferred sidelink resource and/or which bit value indicates a non-preferred sidelink resource, or a combination thereof. In some examples, the UE 115-*a* may transmit the coordination message 215 via physical layer signaling (e.g., sidelink control signaling), media access control (MAC) signaling (e.g., a MAC control element (MAC-CE)), radio resource control (RRC) signaling, or a combination thereof.

The UE 115-*b* may receive the coordination message 215 and may include or exclude the indicated resources in a set of candidate resources. For example, the coordination message 215 may include a preference indication that indicates a set of preferred resources and the UE 115-*b* may include the preferred resources in the set of candidate resources. In some other examples, the coordination message 215 may indicate a set of non-preferred resources and the UE 115-*b* may exclude the non-preferred resources from the set of candidate resources. In some examples, the UE 115-*b* may receive multiple coordination messages 215 from multiple UEs 115. For example, the UE 115-*b* may receive one or more coordination messages 215 from one or more UEs 115 (e.g., different from the UE 115-*a*) in addition to the coordination message 215 received from the UE 115-*a*. Each coordination message 215 may indicate respective preferences of respective UEs 115 (e.g., via one or more bitmaps) for sidelink resources of the second set of sidelink resources. Here the UE 115-*b* may identify the set of candidate resources from the second set of sidelink resources based on the multiple coordination messages 215 (e.g., the respective preferences indicated by the respective preference indications).

The UE 115-*b* may further determine the set of candidate resources based on a sensing procedure performed by the UE 115-*b*. For example, the UE 115-*b* may determine a resource selection window for its own resource selection procedure. In some examples, the UE 115-*b* may determine the resource selection window such that the determined resource selection window is at least partially overlapping with time window of UE-115-*a*'s resource preference indication. The UE 115-*b* may monitor a set of sidelink resources for SCI to determine which sidelink resources of a second set of sidelink resources (e.g., of the resource selection window) are available and which sidelink resources are reserved (e.g., unavailable). Based on the monitoring, the UE 115-*b* may determine whether a given sidelink resource of the second set of sidelink resources is available and may include available resources in the set of candidate resources. The UE 115-*b* may measure the RSRP of SCI 210-*c* that reserves one or more sidelink resources of the second set of sidelink resources and may compare the measured RSRP to a threshold RSRP. Based on the comparison, the UE 115-*b* may determine whether the measured RSRP satisfies the threshold RSRP and may determine the availability of the one or more sidelink resources accordingly. For example, if the measured RSRP satisfies (e.g., is greater than, is greater than or equal to) the threshold RSRP, the UE 115-*b* may determine that the one or more sidelink resources reserved by the SCI 210 are not available. Alternatively, if the measured RSRP fails to satisfy (e.g., is less than, is less than or equal to) the threshold RSRP, the UE 115-*b* may determine that the one or more sidelink resources reserved by the SCI 210 are available. That is, in some cases, the UE 115-*b* may determine that a sidelink resource is preferred (e.g., available), even if the sidelink resource is reserved by SCI 210 (e.g., 210-*c*), if an RSRP of the SCI 210 fails to satisfy a threshold RSRP.

The UE 115-*b* may determine the threshold RSRP according to various techniques. In some examples, the threshold RSRP may be a pre-configured threshold RSRP that is common to the UEs 115 of the wireless communications system 200 (e.g., common to the UE 115-*a*, the UE 115-*b*, the UE 115-*c*, and the UE 115-*d*). In some cases, the threshold RSRP may be configured by a network (e.g., a core network 130 via a base station 105 described with reference to FIG. 1) and may be common to the UEs 115 of the wireless communications system 200.

In some examples, the UE 115-*b* may explicitly indicate the threshold RSRP to the UE 115-*a*. For example, the UE 115-*b* may transmit a coordination request 220 (e.g., before, after, or during the sensing window) that requests the UE 115-*a* to indicate preference information for the second set of sidelink resources to the UE 115-*b*. The coordination request 220 may additionally, or alternatively, indicate the threshold RSRP for the UE 115-*a* to use in its sidelink resource preference determination. In some examples, the coordination request 220 may indicate a value of threshold RSRP. In some other examples, the coordination request 220 may indicate an index of a set of indexes, the index corresponding to the value of the threshold RSRP of a set of values of the threshold RSRP. In some cases, the value of the threshold RSRP may have units of decibel milliwatts (dBm). In some examples, the threshold RSRP may be a power spectral density (PSD) RSRP threshold associated with the second set of sidelink resources. For example, a PSD RSRP threshold may indicate the received power within a channel bandwidth of a subchannel of the second set of sidelink resources that may satisfy the threshold RSRP. In some examples, the UE 115-*b* may transmit the coordination request 220 via an SCI-2 message, MAC-control element (MAC-CE) signaling, RRC signaling, or a combination thereof.

In some examples, the threshold RSRP may be implicitly indicated to the UE 115-*b* or the UE 115-*a*, or both. For example, the UE 115-*b* may determine the threshold RSRP based on mapping a priority level associated with a transmission of the UE 115-*b* to the threshold RSRP. For instance, the SCI 210-*a* may indicate a priority level associated with the sidelink resources reserved by the SCI 210-*a*. Additionally, or alternatively, the coordination request 220 may indicate a priority level associated with sidelink messages 225 transmitted by the UE 115-*b*, the sidelink resources reserved by the SCI 210-*a*, or a combination thereof. Here, the coordination request 220 may not include the indication of the threshold RSRP. The priority level may correspond to a particular threshold RSRP of a set of threshold RSRPs. Accordingly, the UE 115-*a* may map the priority level (e.g., indicated by the SCI 210-*a* or the coordination request 220) to the corresponding threshold RSRP to determine the threshold RSRP. In some examples, a mapping between a set of priority levels that includes the priority level and the set of threshold RSRPs may be a preconfigured mapping (e.g., common to the UEs 115 of the wireless communications system 200). In some other examples, the mapping may be configured by a network (e.g., and may be common to the UEs 115 of the wireless communications system). In some cases, as priority level increases, the corresponding threshold RSRP may also increase, and vice versa.

In some examples, the UE 115-*b* may select the threshold RSRP such that a threshold percentage of the second set of sidelink resources are determined to be available. For example, the UE 115-*b* may select the threshold RSRP such that at least x percent of the second set of sidelink resources are determined to be available, where x is some value from 0 to 100. That is, the UE 115-*b* may select the threshold RSRP such that at least x percent of the second set of sidelink resources are either unreserved (e.g., available) or are reserved but by an SCI 210 with an RSRP that fails to satisfy the threshold RSRP. Alternatively, the UE 115-*b* may select the threshold RSRP such that at least y percent of the second set of sidelink resources are determined to be available (e.g., satisfy the threshold RSRP), where y is some value from 0 to 100. That is, the UE 115-*b* may select the threshold RSRP such that at least y percent of the second set of sidelink resources are reserved by an SCI 210 with an RSRP that satisfies the threshold RSRP. In some examples, the value of x, the value of y, or both, may be pre-configured values or configured by a network. In some examples, the UE 115-*b* may adjust a value of the threshold RSRP until the threshold percentage of the second set of sidelink resources are available. For example, if a quantity of sidelink resources fails to satisfy the threshold percentage for a selected threshold RSRP, the UE 115-*b* may progressively increase or decrease (e.g., according to a preconfigured step size), respectively, the threshold RSRP until the threshold percentage is satisfied.

Additionally, or alternatively, the UE 115-*b* may determine the availability of a sidelink resource based on a priority level associated with the sidelink resource. For example, the UE 115-*b* may determine the priority level associated with the sidelink resource (e.g., based on SCI 210 that reserves the sidelink resource, based on a coordination request 220) and may compare the priority level to a priority threshold. Based on the comparison, the UE 115-*b* may determine whether the priority level satisfies the priority threshold and may determine the availability for the sidelink resource accordingly. For example, if the priority level satisfies (e.g., is greater than, is greater than or equal to) the priority threshold, the UE 115-*b* may determine that the sidelink resource is available. Alternatively, if the priority level fails to satisfy (e.g., is less than, is less than or equal to) the priority threshold, the UE 115-*b* may determine that the sidelink resource is not available. In some examples, the UE 115-*b* may determine that the sidelink resource is available irrespective of an RSRP associated with the sidelink resource. That is, in some examples, the UE 115-*b* may determine that a sidelink resource is available if the priority level satisfies the priority threshold even if the associated RSRP is relatively high (e.g., satisfies a threshold RSRP). In some other examples, if the priority level fails to satisfy the priority threshold, the UE 115-*b* may determine the sidelink resource availability based on the RSRP of the SCI 210-*c* that reserves the sidelink resource (e.g., comparing the RSRP to a threshold RSRP). In some examples, unreserved sidelink resources may not be associated with a priority level and may be determined to be available by the UE 115-*b*.

The UE 115-*b* may determine the priority threshold according to various techniques. In some examples, the priority threshold may be a pre-configured priority threshold that is common to the UEs 115 of the wireless communications system 200. In some cases, the priority threshold may be configured by a network (e.g., a core network 130 via a base station 105 described with reference to FIG. 1) and may be common to the UEs 115 of the wireless communications system 200.

In some examples, the priority threshold may be explicitly indicated to the UE 115-*b*. For example, the UE 115-*a* may transmit a threshold message 230 to the UE 115-*a* that indicates the threshold priority to be used by the UE 115-*b*. In some examples, the threshold message 230 may be an example of a coordination request 220. In some cases, the UE 115-*a* may transmit the threshold message 230 via sidelink control signaling (e.g., an SCI-2 message), MAC-CE signaling, RRC signaling, or a combination thereof.

In some examples, the UE 115-*b* may select the priority threshold such that a threshold percentage of the second set of sidelink resources are determined to be available. For example, the UE 115-*b* may select the priority threshold such that at least w percent of the second set of sidelink resources are determined to be available (e.g., satisfy the priority threshold), where w is some value from 0 to 100. That is, the UE 115-*b* may select the priority threshold such that at least w percent of the second set of sidelink resources are either unreserved (e.g., available) or are reserved but are associated with a priority level that satisfies the priority threshold. Alternatively, the UE 115-*b* may select the priority threshold such that at least z percent of the second set of sidelink resources are determined to be unavailable (e.g., fail to satisfy the priority threshold), where z is some value from 0 to 100. That is, the UE 115-*b* may select the priority threshold such that at least z percent of the second set of sidelink resources are reserved and associated with a priority level that fails to satisfy the threshold RSRP. In some examples, the value of w, the value of z or both, may be pre-configured values or configured by a network. In some examples, the UE 115-*b* may adjust the priority threshold until the threshold percentage of the second set of sidelink resources are available. For example, if a quantity of sidelink resources fails to satisfy the threshold percentage for a selected priority threshold, the UE 115-*b* may progressively decrease or increase, respectively, the priority threshold until the threshold percentage is satisfied.

Regardless of the manner in which the UE 115-*b* identifies whether resources are available or not, the UE 115-*b* may transmit an indication of the threshold used to make the determination to the UE 115-*a*—likewise, based on its own sensing procedure, the UE 115-*a* may transmit an indication of the threshold used to make the determination to the UE 115-*b* such that both UE 115-*b* and UE 115-*a* are aware of the parameters (e.g., RSRP threshold, priority threshold, and the like) for determining whether resources are to be included in the set of candidate resources (e.g., determined to be available).

The UE 115-*b* may transmit one or more sidelink messages 225 (e.g., a sidelink message 225-*a* through a sidelink message 225-*n*) to the UE 115-*a* using one or more of the candidate resources. For example, the UE 115-*b* may select one or more candidate resources for transmitting the one or more sidelink messages 225. In some examples, the UE 115-*b* may down-select the one or more sidelink resources from sidelink resources reserved by the SCI 210-*a*. For example, if the UE 115-*b* transmitted the SCI 210-*a* to reserve one or more sidelink resources for the transmission of the one or more sidelink messages 225, the UE 115-*b* may determine whether any of the reserved sidelink resources are included in the set of candidate resources and may refrain from transmitting the one or more sidelink messages 225 using non-candidate sidelink resources. Instead, the UE 115-*b* may transmit the one or more sidelink messages 225 on remaining sidelink resources reserved by the SCI 210-*a* that are included in the set of candidate resources. Additionally, or alternatively, the UE 115-*b* may transmit new SCI 210 that reserves one or more preferred sidelink resources and may transmit the one or more sidelink messages 225 using one or more candidate resources. In some other examples, the UE 115-*b* may not have previously transmitted the SCI 210-*a*. Here, the UE 115-*b* may select one or more candidate resources of the second set of sidelink resources and may transmit SCI 210 (e.g., SCI 210-*a*) to reserve the one or more candidate resources. The UE 115-*b* may then transmit the one or more sidelink messages 225 using the one or more candidate sidelink resources.

Accordingly, the UE 115-*b* may select sidelink resources based on sidelink resource preferences indicated by the UE 115-*a* (e.g., and one or more other UEs 115) in addition to sidelink resource reservations detected by the UE 115-*b* (e.g., from UE 115-*c*), which may increase the reliability of the sidelink messages 225 transmitted by the UE 115-*b*.

Figure 3:
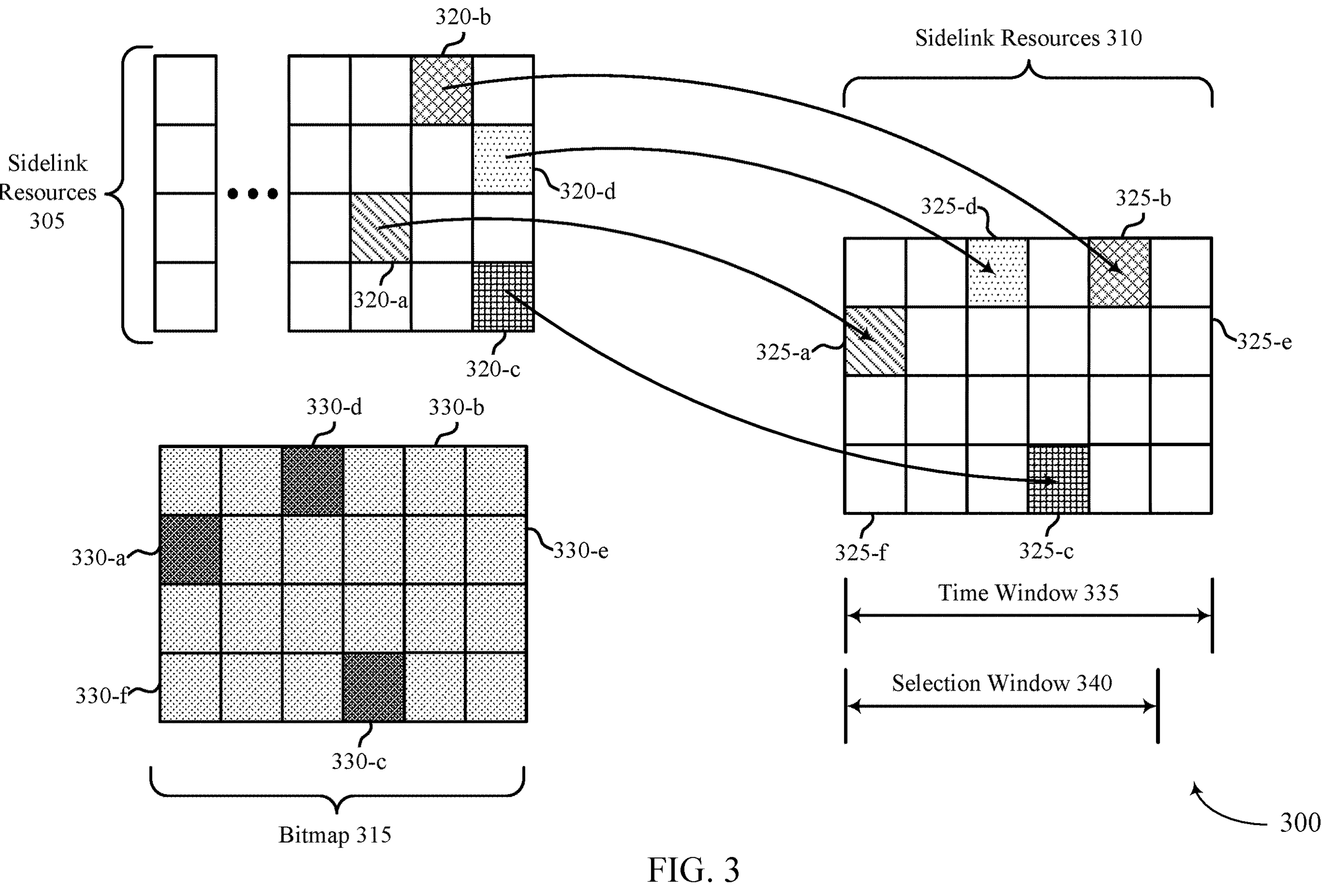
FIG. 3 illustrates an example of a resource diagram that supports inter-UE coordination information-based resource allocation in accordance with aspects of the present disclosure.

FIG. 3 illustrates an example of a resource diagram 300 that supports inter-UE coordination information-based resource allocation in accordance with aspects of the present disclosure. The resource diagram 300 may be implemented by aspects of the wireless communications system 100 and 200 as described with reference to FIGS. 1 and 2, respectively. For example, the resource diagram 300 may be implemented by one or more UEs 115 to support inter-UE sidelink coordination which may provide improvements to reliability, sidelink resource selection and reservation, resource usage, data rates, spectral efficiency, latency, coordination between devices, power consumption, battery life, and processing capability among other benefits.

The resource diagram 300 depicts a set of sidelink resources 305 and a set of sidelink resources 310. The set of sidelink resources 305 may span a first quantity of slots in a time domain and a first quantity of subchannels in a frequency domain, and the set of sidelink resources 310 may span a second quantity of slots in the time domain and a second quantity of subchannels in the frequency domain. In some examples, the set of sidelink resources 305 may correspond to a sensing window during which a UE 115 may decode SCI to determine which sidelink resources 325 of the set of sidelink resources 310 are available for reservation (e.g., for transmission of a sidelink message by the UE). For example, the set of sidelink resources 305 may include SCI 320-*a*, SCI 320-*b*, SCI 320-*c*, and SCI 320-*d*, which may each reserve one or more sidelink resources 325 of the set of sidelink resources 310. In the example of FIG. 3, the SCI 320-*a* may reserve the sidelink resource 325-*a* of the set of sidelink resources 310, the SCI 320-*b* may reserve the sidelink resource 325-*b* of the set of sidelink resources 310, the SCI 320-*c* may reserve the sidelink resource 325-*c* of the set of sidelink resources 310, and the SCI 320-*d* may reserve the sidelink resource 325-*d* of the set of sidelink resources 310.

A UE 115 may monitor the set of sidelink resources 305 for the SCI 320 and may decode one or more of the SCI 320-*a*, the SCI 320-*b*, the SCI 320-*c*, and the SCI 320-*d*. The UE 115 may generate an inter-UE coordination message which may, in some examples, include bitmap 315 associated with the set of sidelink resources 310 based on the decoded SCI 320. For example, the UE 115 may determine a preference for one or more of the sidelink resources 325 based on the decoded SCI 320 (e.g., based on whether an RSRP of the SCI 320 satisfies a threshold, based on whether a priority level associated with the SCI 320 satisfies a priority threshold) and may generate the bitmap 315 based on the determined preferences. In the example of FIG. 3, the UE 115 may determine that the sidelink resources 325-*a*, 325-*c*, and 325-*d* are non-preferred resources and that the sidelink resource 325-*b* is a preferred sidelink resource. The UE 115 may also determine that remaining sidelink resources 325 of the set of sidelink resources 310 (e.g., sidelink resource 325-*e*, sidelink resource 325-*f*, etc.) are preferred sidelink resources, for example, based on the remaining sidelink resources 325 being unreserved.

The bitmap 315 may include bits 330 that correspond to the sidelink resources 325 and indicate the determined preferences for the sidelink resources 325. For example, each bit 330 may correspond (e.g., map) to a particular sidelink resource 325 and may indicate the determined preference for the particular sidelink resource 325. In an example, if the set of sidelink resources 310 corresponds to a thirty-two slot window with each slot spanning ten subchannel, the set of sidelink resources 310 may include three hundred and twenty sidelink resources 325 and the bitmap 315 may include three hundred and twenty bits 330, with each bit 330 corresponding to one of the sidelink resources 325. For instance, bit 330-*a* may correspond to sidelink resource 325-*a*, bit 330-*b* may correspond to sidelink resource 325-*b*, bit 330-*c* may correspond to sidelink resource 325-*c*, bit 330-*d* may correspond to sidelink resource 325-*d*, bit 330-*e* may correspond to sidelink resource 325-*e*, bit 330-*f* may correspond to sidelink resource 325-*f*, and so on. The UE 115 may generate the bitmap 315 such that bit 330-*a*, bit 330-*c*, and bit 330-*d* may indicate that the sidelink resource 325-*a*, the sidelink resource 325-*c*, and the sidelink resource 325-*d* are non-preferred sidelink resources, respectively, based on the preference determination. Additionally, the UE 115 may generate the bitmap 315 such that the remaining bits 330 (e.g., bit 330-*b*, bit 330-*e*, bit 330-*f*, etc.) may indicate that remaining sidelink resources 325 (e.g., the sidelink resource 325-*b*, the sidelink resource 325-*e*, the sidelink resource 325-*f*, etc.) are preferred sidelink resources based on the preference determination. In some examples, the UE 115 may generate the bitmap 315 to indicate the bits 330 corresponding to the non-preferred sidelink resources 325. In some other examples, the UE 115 may generate the bitmap 315 to indicate the bits 330 corresponding to the preferred sidelink resources 325.

The UE 115 may transmit the bitmap 315 in a coordination message to a second UE 115. The second UE 115 may decode the bitmap 315 to determine the preference(s) of the UE 115 for the sidelink resources 325 and may transmit one or more sidelink messages to the UE 115 (e.g., or other UEs 115) based on the preferences and based on a sensing procedure performed at the second UE. For example, the second UE 115 may exclude the sidelink resource 325-*a*, the sidelink resource 325-*c*, and the sidelink resource 325-*d* from a set of candidate sidelink resources 325 of the set of sidelink resources 310 that are available for selection based on the bitmap 315 indicating the sidelink resource 325-*a*, the sidelink resource 325-*c*, and the sidelink resource 325-*d* as non-preferred. In some examples, the second UE 115 may exclude the sidelink resource 325-*a*, the sidelink resource 325-*c*, and the sidelink resource 325-*d* from a set of candidate sidelink resources 325 of the set of sidelink resources 310 that are available for selection based on the bitmap 315 indicating the sidelink resource 325-*b*, and the remaining sidelink resources as preferred. The bitmap 315 may indicate a future time window 335 (e.g., a time window 335 corresponding to sidelink resources 310) and the UE 115 may indicate preferred or non-preferred resources within the future time window 335 through coordination signaling (e.g., a coordinate message that may include bitmap 315).

In some examples, the second UE 115 may perform resource selection to identify resources available for transmission of a sidelink message or for reservation for sidelink communications by the second UE 115. The resource selection procedure may be based on a resource selection window 340 which may at least partially overlap with time window 335 associated with sidelink resources 310. The resource selection window 340 may be based on packet delay budget for the sidelink message to be transmitted by the second UE 115 (e.g., may be based on remaining packet delay budget associated with the second UE 115 or with the sidelink message, which may have a corresponding priority that indicates the packet delay budget). The second UE 115 may receive a coordination message from the UE 115 (e.g., a bitmap 315) which indicates preferred resources (e.g., sidelink resource 325-*b*) or non-preferred resources (e.g., sidelink resources 325-*a*, 325-*c*, and 325-*d*) of the second UE that are within the time window 335.

In some cases, the second UE 115 may determine a resource selection window 340 such that at least one resource indicated by the UE 115 (e.g., preferred resources such as sidelink resource 325-*b*) is included in the resource selection window 340. In some cases, the second UE 115 may adjust the resource selection window 340 in time or frequency such that at least one resource of the time window 335 indicated by the UE 115 is included in the resource selection window 340. In such cases, the resource selection window 340 and the time window 335 may partially or wholly overlap in time, frequency, or both.

When determining the candidate resources for selection within a resource selection window 340, the second UE 115 may exclude resources indicated as non-preferred resources (e.g., sidelink resources 325-*a*, 325-*c*, and 325-*d*), as conveyed in the preference of the UE 115, from a total set of candidate resources within the resource selection window 340. The second UE 115 may perform sidelink sensing on the remaining resources within the resource selection window 340 (e.g., the total set of candidate resources excluding sidelink resources 325-*a*, 325-*c*, and 325-*d*) to identify resources (e.g., candidate resources) that are available for selection by the second UE 115 for sidelink communications. In some cases, the UE 115 may indicate resources that are preferred (e.g., sidelink resource 325-*b*) by the UE (e.g., as part of the preference of the UE 115, and the second UE 115 may include or exclude the preferred resources (e.g., sidelink resource 325-*b*) from the resource selection window 340 when determining candidate resources for resource selection.

Additionally, or alternatively, the second UE may determine candidate resource within the resource selection window 340 by initially determining a total set of resources (e.g., all resources) within the resource selection window 340 and performing a sidelink sensing procedure to identify available resources from the total set of resources within the resource selection window 340. If the UE 115 indicates preferred resources (e.g., sidelink resource 325-*b*), which are preferred by the UE 115 as part of the preference of the UE 115 in the time window 335, the second UE 115 may determine candidate resources as resources that are identified as available resources based on sidelink sensing and determined as preferred by the UE 115. The second UE may select from these candidate resources for sidelink communications.

Figure 4:
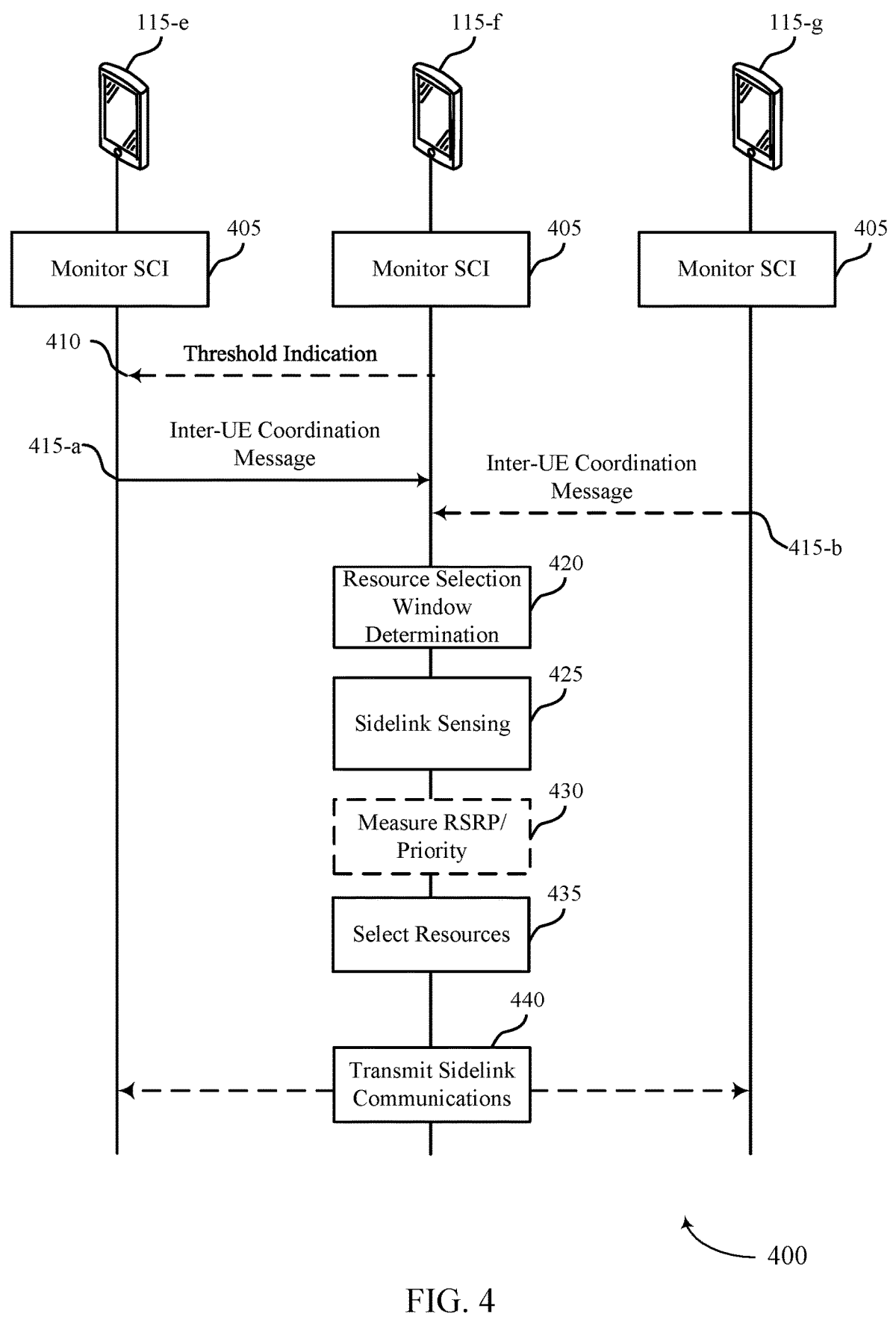

FIG. 4 illustrates an example of a process flow 400 that supports inter-UE coordination information-based resource allocation in accordance with aspects of the present disclosure. The process flow 400 may implement aspects of the wireless communications systems 100 and 200 or may be implemented by aspects of the wireless communications system 100 and 200 as described with reference to FIGS. 1 and 2, respectively. For example, the process flow 400 may be implemented by a UE 115-*d*, a UE 115-*e*, and a UE 115-*f* to support indicating sidelink resource preferences to increase reliability of sidelink communications and improve sidelink resource selection and reservation schemes (e.g., during Mode 2 operation). The process flow 400 may further be implemented by the UE 115-*d*, the UE 115-*e*, and the UE 115-*f* to provide improvements to data rates, spectral efficiency, coordination between devices, power consumption, resource usage, battery life, and processing capability among other benefits.

The UE 115-*d*, the UE 115-*e*, and the UE 115-*f* may be examples of a UE 115, as described with reference to FIGS. 1 and 2. In the following description of the process flow 400, the operations may be performed in different orders or at different times. Some operations may also be omitted from the process flow 400, and other operations may be added to the process flow 400.

At 405, the UE 115-*e*, UE 115-*f*, and UE 115-*g* may monitor respective sets of sidelink resources for SCI. For example, a set of sidelink resources may correspond to a sensing window during which other UEs 115 (e.g., the UE 115-*d*, the UE 115-*f*, or other UEs 115) may transmit SCI to reserve one or more sidelink resources of a second set of sidelink resources.

At 410, the UE 115-*f* may transmit an indication of the parameters used to determine which resources are available to the UE 115-*e*. For example, the UE 115-*f* may transmit an indication of an RSRP threshold, or a priority threshold, or both. In some cases, the UE 115-*f* may indicate a threshold RSRP used to determine the availability for the one or more sidelink resources. In some examples, the UE 115-*f* may determine a priority level associated with sidelink resources reserved by one or more other UE or associated with sidelink messages transmitted by one or more other UE, where the priority level maps to a threshold RSRP of a set of threshold RSRPs and may indicate the priority level to the UE 115-*e*. In some cases, the UE 115-*f* may indicate a priority threshold used to determine the availability for the one or more sidelink resources. The UE 115-*f* may transmit the indication to the UE 115-*e* via sidelink control signaling (e.g., SCI), MAC signaling (e.g., a MAC-CE), RRC signaling, or a combination thereof.

At 415-*a*, the UE 115-*e* may transmit a coordination message to the UE 115-*f* that includes a set of preferences of the UE 115-*e* for the UE 115-*f* to transmit on one or more sidelink resources of the second set of sidelink resources. For example, the UE 115-*e* may determine the preferences for the one or more sidelink resources (e.g., whether each of the one or more sidelink resources are preferred or non-preferred) based on SCI from one or more other UE, an RSRP of the SCI from one or more other UE, the threshold RSRP, the priority threshold, or a combination thereof. The UE 115-*e* may generate a bitmap including bits that correspond to the one or more sidelink resources and indicate a respective preference for the corresponding sidelink resource. In some examples, the UE 115-*e* may generate multiple bitmaps. For example, the UE 115-*e* may generate a respective bitmap for two or more priority thresholds of a set of priority thresholds. In some examples, the coordination message may further include an indication of the priority threshold used to generate the bitmap, an indication of the threshold RSRP used to generate the bitmap, an indication of whether the preferences for the one or more sidelink resources are associated with preferred sidelink resources or non-preferred sidelink resources, or a combination thereof. In some instances, the coordination message may include multiple bitmaps generated by the UE 115-*e*. In some cases, the UE 115-*e* may transmit the coordination message in SCI, a MAC-CE, an RRC message, or a combination thereof. In some examples, at 415-*b*, the UE 115-*g* may additionally transmit a coordination message to the UE 115-*f* that includes a set of preferences of the UE 115-*g* for the UE 115-*f* to transmit sidelink communications on one or more sidelink resources of the second set of sidelink resources.

At 420, the UE 115-*f* may determine or select a resource selection window for performing a sensing procedure. For example, the UE 115-*f* may select a future set of resources which it will determine to be available or unavailable independent of the preferences indicated by the UE115-*e* or 115-*g* or may select a resource selection window to at least partially overlap with at least one of the preferred resources indicated (e.g., implicitly or explicitly) by the UE 115-*e* or UE 115-*g*.

At 425, the UE 115-*f* may receive SCI from the UE 115-*f*, the UE 115-*g*, or one or more other UE 115 and may decode the received SCI to determine which resources of the resource selection window are reserved. For example, at 430, the UE 115-*f* may measure an RSRP of the received SCI to determine which resources are reserved and may include unreserved resources in a set of candidate resources along with the resources indicated by the UE 115-*e* as preferred. In some examples, at 430, the UE 115-*f* may determine a priority associated with future transmissions indicated by the received SCI to determine which resources are reserved and may include unreserved resources in the set of candidate resources along with the resources indicated by the UE 115-*e* as preferred.

At 435, the UE 115-*f* may select one or more candidate resources from the resource selection window for transmitting sidelink communications.

At 440, the UE 115-*f* may transmit one or more sidelink messages using the selected candidate resources. For example, the UE 115-*f* may receive the coordination message and/or may decode the bitmap(s) to determine the preferences of the UE 115-*e* for the one or more sidelink resources of the second set of sidelink resources and may include resources identified as available by its own sensing procedure along with the preferred resources in the set of candidate resources. For example, the UE 115-*f* may include resources indicated as preferred or may exclude resources indicated as non-preferred or both, in the set of candidate resources along with resources identified as available by the UE 115-*f*. The UE 115-*f* may select one or more candidate resources and may transmit the one or more sidelink messages using the one or more preferred sidelink resources. In such a way, the UE 115-*f* transmit on resources that avoid collision based on interference as sensed by the UEs 115-*e* or UE 115-*g* or both as well as interference sensed by the UE 115-*g*, thus decreasing the likelihood that the sidelink transmission will conflict with another sidelink transmission.

Figure 5:
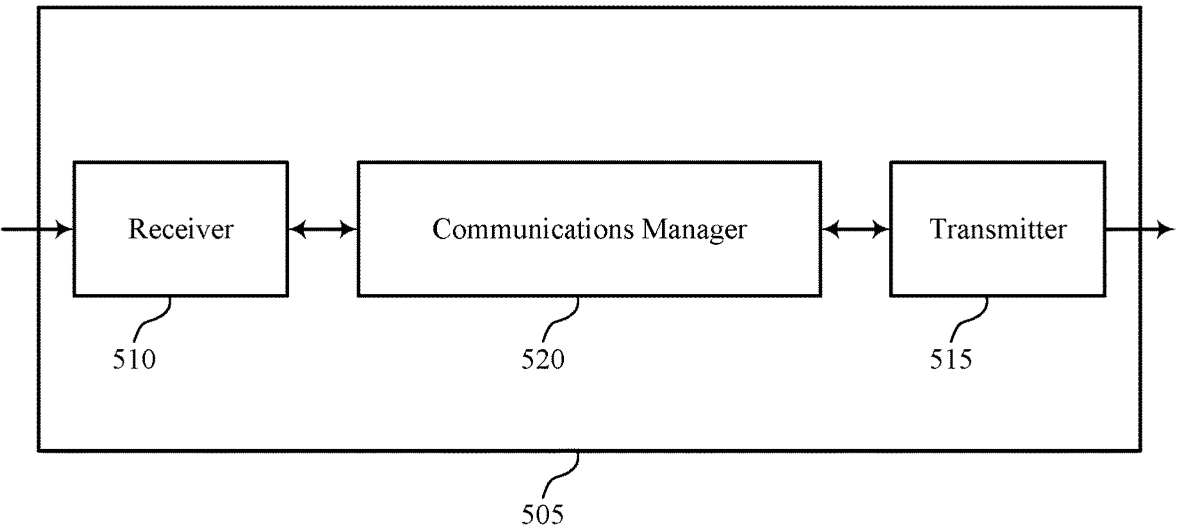
FIGS. 5 and 6 show block diagrams of devices that support inter-UE coordination information-based resource allocation in accordance with aspects of the present disclosure.

FIG. 5 shows a block diagram 500 of a device 505 that supports inter-UE coordination information-based resource allocation in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to inter-UE coordination information-based resource allocation). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to inter-UE coordination information-based resource allocation). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of inter-UE coordination information-based resource allocation as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first UE in accordance with examples as disclosed herein. For example, the communications manager 520 may be configured as or otherwise support a means for receiving, from a second UE, a coordination message indicating a preference of the second UE for one or more sets of resources associated with sidelink communications. The communications manager 520 may be configured as or otherwise support a means for determining a resource selection window based on remaining packet delay budget associated with the first UE. The communications manager 520 may be configured as or otherwise support a means for determining a set of candidate resources in the resource selection window for resource selection by the first UE based on the preference of the second UE for the one or more sets of resources. The communications manager 520 may be configured as or otherwise support a means for performing a resource selection procedure in the resource selection window to select a set of resources from the set of candidate resources. The communications manager 520 may be configured as or otherwise support a means for transmitting, by the first UE, a sidelink message using the set of resources.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for more efficient utilization of communication resources, such as sidelink resources, which may increase the likelihood of successful sidelink communications between the device 505 and one or more other devices, or between other devices in a communications system. For instance, by using resource selection techniques described herein, device 500 may select resources for communications to reduce or mitigate interference with other devices. Such techniques may lead to a reduction in the number of retransmissions of the device 505 or other devices in the communications system, which may reduce the processing performed by a modem or controller associated with the transmitter 515 or receiver 510, resulting in increased battery life and reduced power consumption at the device 505.

Figure 6:
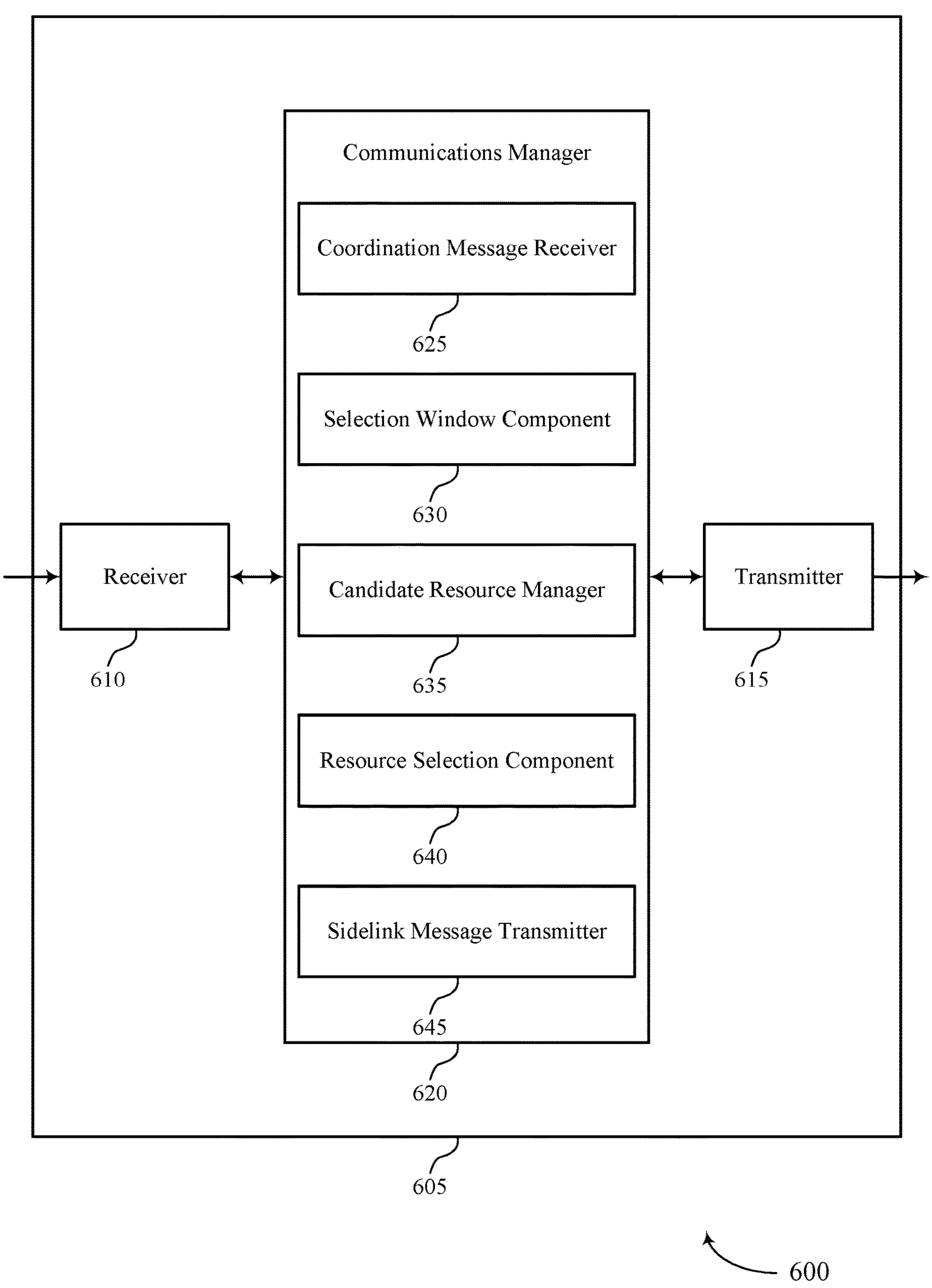

FIG. 6 shows a block diagram 600 of a device 605 that supports inter-UE coordination information-based resource allocation in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to inter-UE coordination information-based resource allocation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to inter-UE coordination information-based resource allocation). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of inter-UE coordination information-based resource allocation as described herein. For example, the communications manager 620 may include a coordination message receiver 625, a selection window component 630, a candidate resource manager 635, a resource selection component 640, a sidelink message transmitter 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first UE in accordance with examples as disclosed herein. The coordination message receiver 625 may be configured as or otherwise support a means for receiving, from a second UE, a coordination message indicating a preference of the second UE for one or more sets of resources associated with sidelink communications. The selection window component 630 may be configured as or otherwise support a means for determining a resource selection window based on remaining packet delay budget associated with the first UE. The candidate resource manager 635 may be configured as or otherwise support a means for determining a set of candidate resources in the resource selection window for resource selection by the first UE based on the preference of the second UE for the one or more sets of resources. The resource selection component 640 may be configured as or otherwise support a means for performing a resource selection procedure in the resource selection window to select a set of resources from the set of candidate resources. The sidelink message transmitter 645 may be configured as or otherwise support a means for transmitting, by the first UE, a sidelink message using the set of resources.

Figure 7:
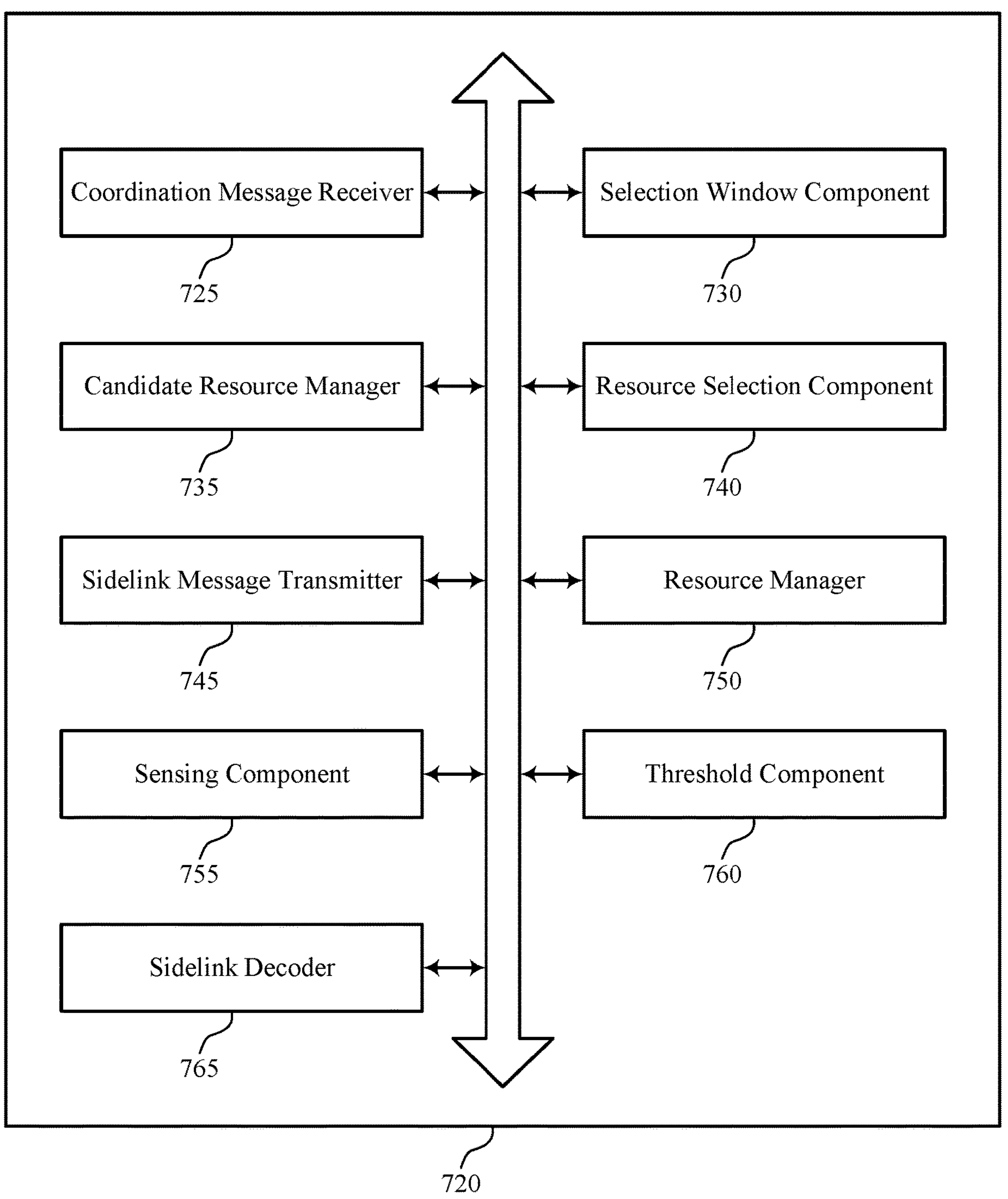
FIG. 7 shows a block diagram of a communications manager that supports inter-UE coordination information-based resource allocation in accordance with aspects of the present disclosure.

FIG. 7 shows a block diagram 700 of a communications manager 720 that supports inter-UE coordination information-based resource allocation in accordance with aspects of the present disclosure. The communications manager 720 may be an example of aspects of a communications manager 520, a communications manager 620, or both, as described herein. The communications manager 720, or various components thereof, may be an example of means for performing various aspects of inter-UE coordination information-based resource allocation as described herein. For example, the communications manager 720 may include a coordination message receiver 725, a selection window component 730, a candidate resource manager 735, a resource selection component 740, a sidelink message transmitter 745, a resource manager 750, a sensing component 755, a threshold component 760, a sidelink decoder 765, or any combination thereof. Each of these components may communicate, directly or indirectly, with one another (e.g., via one or more buses).

The communications manager 720 may support wireless communication at a first UE in accordance with examples as disclosed herein. The coordination message receiver 725 may be configured as or otherwise support a means for receiving, from a second UE, a coordination message indicating a preference of the second UE for one or more sets of resources associated with sidelink communications. The selection window component 730 may be configured as or otherwise support a means for determining a resource selection window based on remaining packet delay budget associated with the first UE. The candidate resource manager 735 may be configured as or otherwise support a means for determining a set of candidate resources in the resource selection window for resource selection by the first UE based on the preference of the second UE for the one or more sets of resources. The resource selection component 740 may be configured as or otherwise support a means for performing a resource selection procedure in the resource selection window to select a set of resources from the set of candidate resources. The sidelink message transmitter 745 may be configured as or otherwise support a means for transmitting, by the first UE, a sidelink message using the set of resources.

In some examples, to support determining the resource selection window, the selection window component 730 may be configured as or otherwise support a means for determining the resource selection window based on the preference of the second UE for the one or more sets of resources such that at least one resource of the one or more sets of resources indicated in the coordination message is included in the resource selection window.

In some examples, to support determining the set of candidate resources in the resource selection window, the resource manager 750 may be configured as or otherwise support a means for determining non-preferred resources in the resource selection window based on the preference of the second UE. In some examples, to support determining the set of candidate resources in the resource selection window, the candidate resource manager 735 may be configured as or otherwise support a means for determining a total set of candidate resources in the resource selection window, the total set of candidate resources being within the resource selection window with the non-preferred resources excluded. In some examples, to support determining the set of candidate resources in the resource selection window, the sensing component 755 may be configured as or otherwise support a means for performing a sidelink sensing procedure to identify available resources in the total set of candidate resources, where the set of candidate resources includes the identified available resources.

In some examples, the coordination message receiver 725 may be configured as or otherwise support a means for receiving an indication of one or more non-preferred resources of the second UE within a time window, where the resource selection window at least partially overlaps in time with the time window and the non-preferred resources are determined based on the indication of the one or more non-preferred resources of the second UE.

In some examples, the coordination message includes an indication of one or more preferred resources of the second UE within a time window, where the resource selection window excludes the one or more preferred resources of the second UE.

In some examples, to support determining the set of candidate resources in the resource selection window, the candidate resource manager 735 may be configured as or otherwise support a means for determining a total set of candidate resources in the resource selection window, the total set of candidate resources being all resources in the resource selection window. In some examples, to support determining the set of candidate resources in the resource selection window, the sensing component 755 may be configured as or otherwise support a means for performing a sidelink sensing procedure to identify available resources in the total set of candidate resources. In some examples, to support determining the set of candidate resources in the resource selection window, the resource manager 750 may be configured as or otherwise support a means for determining a set of preferred resources in the resource selection window based on the preference of the second UE, where the set of candidate resources includes resources that are identified as available resources and in the set of preferred resources.

In some examples, the sensing component 755 may be configured as or otherwise support a means for performing a sidelink sensing procedure to identify available resources in the resource selection window, where the set of candidate resources includes the identified available resources.

In some examples, to support performing the sidelink sensing procedure, the sidelink decoder 765 may be configured as or otherwise support a means for decoding sidelink control information from one or more other UEs. In some examples, to support performing the sidelink sensing procedure, the resource manager 750 may be configured as or otherwise support a means for identifying a first subset of resources within the resource selection window that are reserved by the one or more other UEs and a second subset of resources within the resource selection window including unscheduled resources based on decoding the sidelink control information.

In some examples, the sidelink decoder 765 may be configured as or otherwise support a means for measuring a received power associated with each resource of the first subset of resources. In some examples, the candidate resource manager 735 may be configured as or otherwise support a means for determining the set of candidate resources as resources of the first subset of resources that satisfy a received power threshold based on the measuring.

In some examples, the candidate resource manager 735 may be configured as or otherwise support a means for determining that a first number of candidate resources is below a threshold number of candidate resources, the first number of candidate resources including a number of the set of candidate resources including the resources that satisfy the received power threshold. In some examples, the threshold component 760 may be configured as or otherwise support a means for adjusting the received power threshold based on the first number of candidate resources being below the threshold number of candidate resources.

In some examples, the threshold component 760 may be configured as or otherwise support a means for transmitting the adjusted received power threshold to the second UE.

In some examples, the threshold component 760 may be configured as or otherwise support a means for receiving an indication of a threshold from the second UE, where the indicated preference of the second UE for the one or more sets of resources is based on the threshold.

In some examples, the candidate resource manager 735 may be configured as or otherwise support a means for determining the set of candidate resources based on the threshold.

In some examples, the indication is received in the coordination message.

In some examples, the coordination message includes a bitmap that indicates the preference of the second UE, where each bit of the bitmap indicates an availability of a respective resource within a time window.

In some examples, the resource selection window at least partially overlaps the time window.

Figure 8:
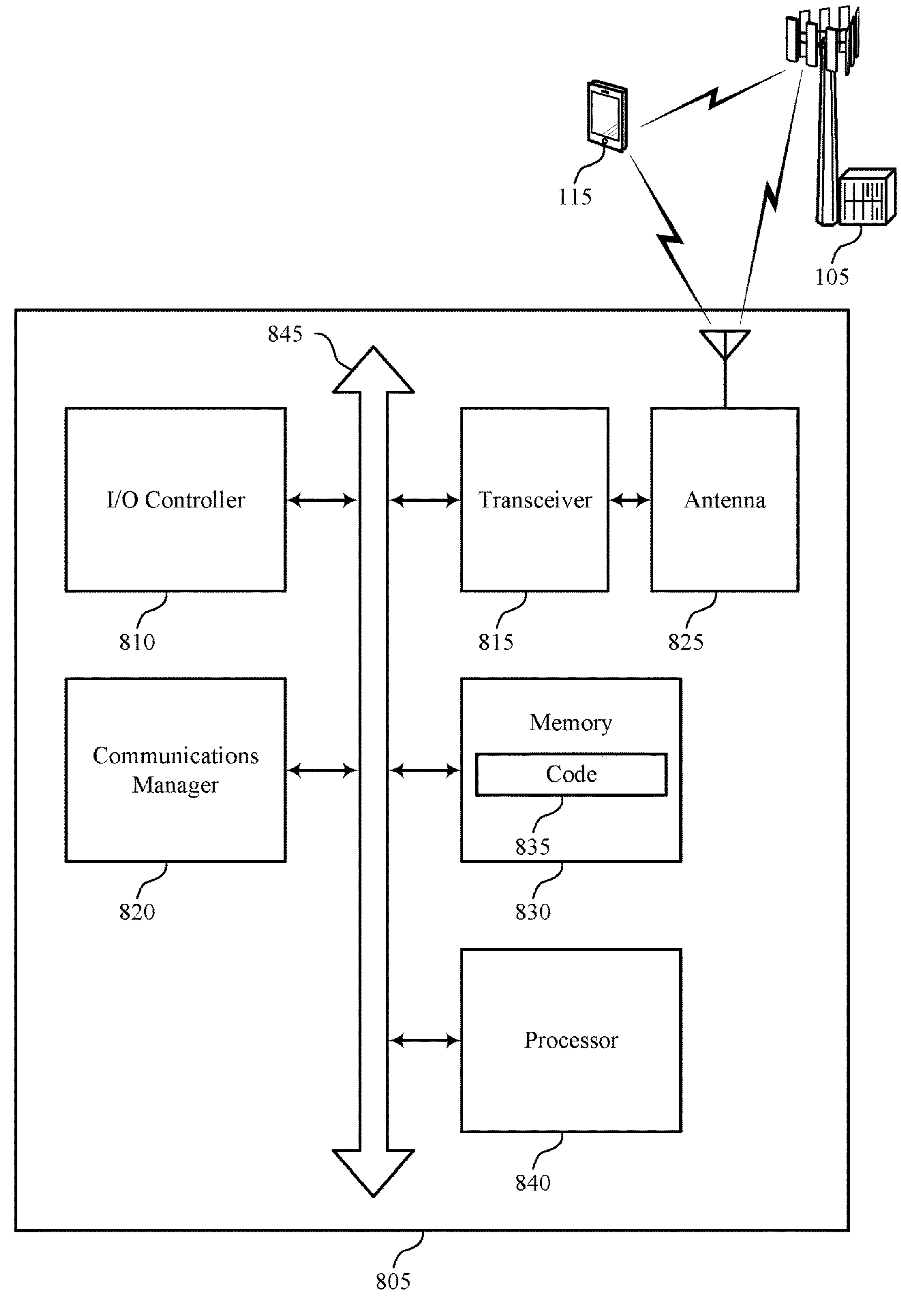
FIG. 8 shows a diagram of a system including a device that supports inter-UE coordination information-based resource allocation in accordance with aspects of the present disclosure.

FIG. 8 shows a diagram of a system 800 including a device 805 that supports inter-UE coordination information-based resource allocation in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting inter-UE coordination information-based resource allocation). For example, the device 805 or a component of the device 805 may include a processor 840 and memory 830 coupled to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving, from a second UE, a coordination message indicating a preference of the second UE for one or more sets of resources associated with sidelink communications. The communications manager 820 may be configured as or otherwise support a means for determining a resource selection window based on remaining packet delay budget associated with the first UE. The communications manager 820 may be configured as or otherwise support a means for determining a set of candidate resources in the resource selection window for resource selection by the first UE based on the preference of the second UE for the one or more sets of resources. The communications manager 820 may be configured as or otherwise support a means for performing a resource selection procedure in the resource selection window to select a set of resources from the set of candidate resources. The communications manager 820 may be configured as or otherwise support a means for transmitting, by the first UE, a sidelink message using the set of resources.

By including or configuring the communications manager 820 in accordance with examples as described herein, the device 805 may support techniques for more efficient utilization of communication resources, such as sidelink resources, which may increase improve communication reliability, reduce latency, and improve user experience through the reduction of retransmissions for the device 805. Such techniques may also improve coordination between devices in the communications system, which may lead to overall network improvements and communication efficiency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of inter-UE coordination information-based resource allocation as described herein, or the processor 840 and the memory 830 may be otherwise configured to perform or support such operations.

Figure 9:
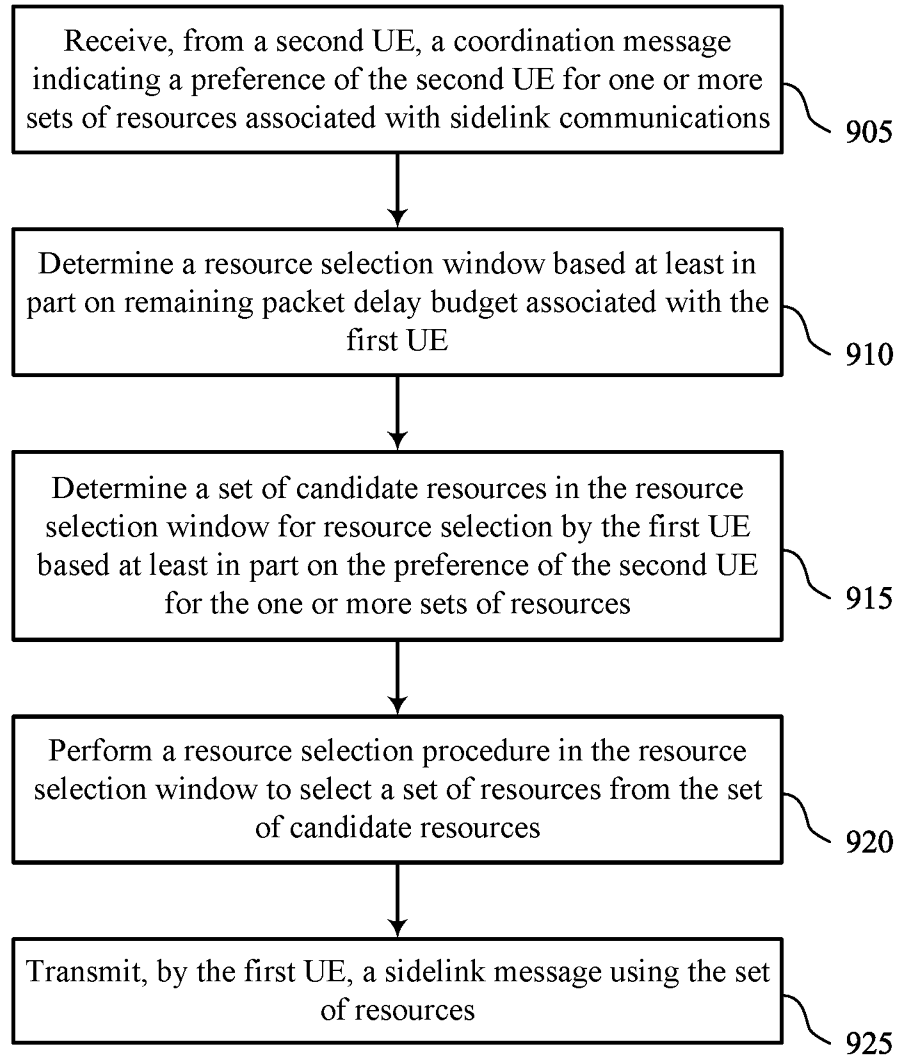
FIGS. 9 through 12 show flowcharts illustrating methods that support inter-UE coordination information-based resource allocation in accordance with aspects of the present disclosure.

FIG. 9 shows a flowchart illustrating a method 900 that supports inter-UE coordination information-based resource allocation in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving, from a second UE, a coordination message indicating a preference of the second UE for one or more sets of resources associated with sidelink communications. The operations of 905 may be performed in accordance with examples as disclosed herein. In some examples, aspects of the operations of 905 may be performed by a coordination message receiver 725 as described with reference to FIG. 7.

At 910, the method may include determining a resource selection window based on remaining packet delay budget associated with the first UE. The operations of 910 may be performed in accordance with examples as disclosed herein. In some examples, aspects of the operations of 910 may be performed by a selection window component 730 as described with reference to FIG. 7.

At 915, the method may include determining a set of candidate resources in the resource selection window for resource selection by the first UE based on the preference of the second UE for the one or more sets of resources. The operations of 915 may be performed in accordance with examples as disclosed herein. In some examples, aspects of the operations of 915 may be performed by a candidate resource manager 735 as described with reference to FIG. 7.

At 920, the method may include performing a resource selection procedure in the resource selection window to select a set of resources from the set of candidate resources. The operations of 920 may be performed in accordance with examples as disclosed herein. In some examples, aspects of the operations of 920 may be performed by a resource selection component 740 as described with reference to FIG. 7.

At 925, the method may include transmitting, by the first UE, a sidelink message using the set of resources. The operations of 925 may be performed in accordance with examples as disclosed herein. In some examples, aspects of the operations of 925 may be performed by a sidelink message transmitter 745 as described with reference to FIG. 7.

Figure 10:
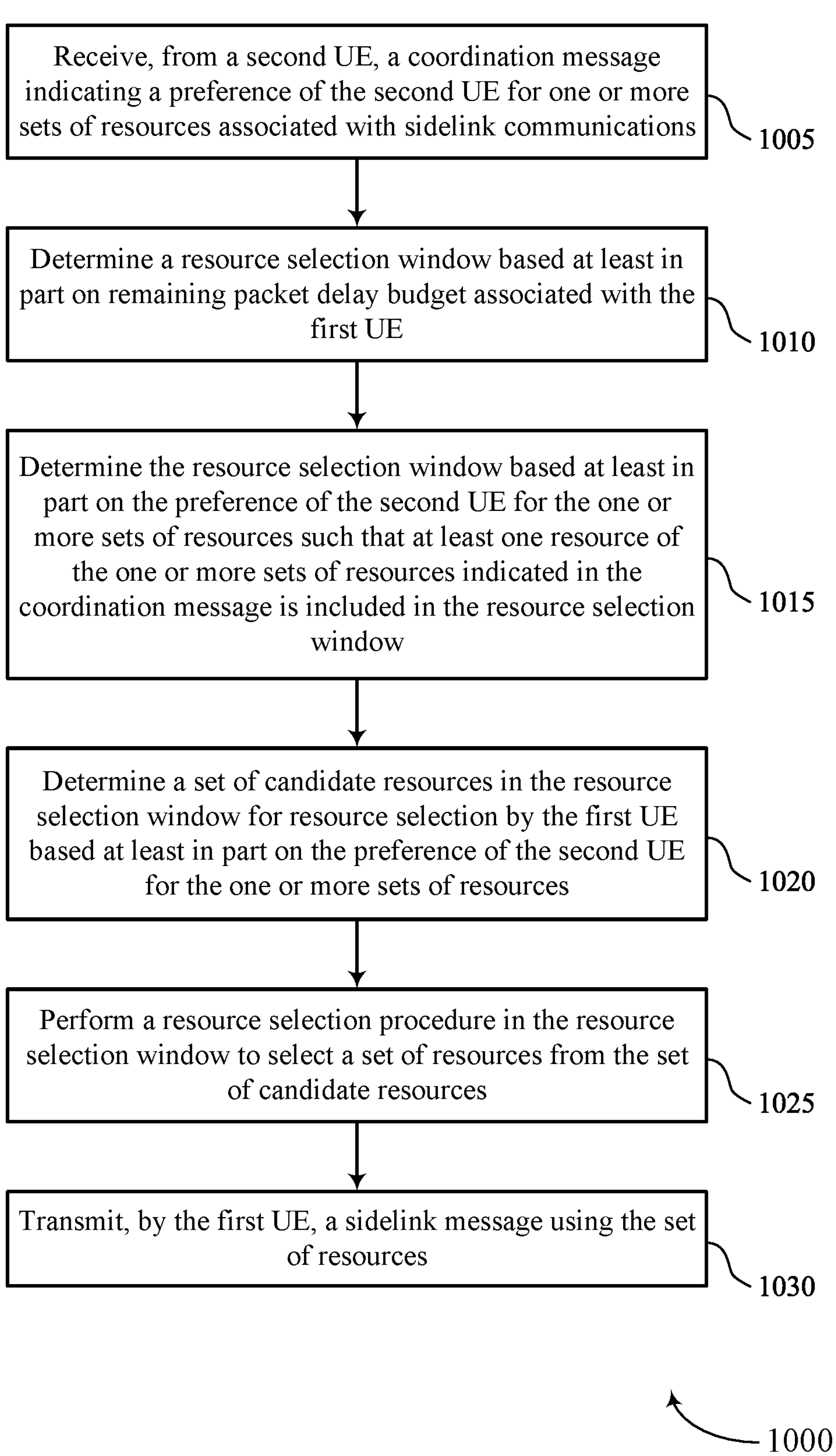

FIG. 10 shows a flowchart illustrating a method 1000 that supports inter-UE coordination information-based resource allocation in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving, from a second UE, a coordination message indicating a preference of the second UE for one or more sets of resources associated with sidelink communications. The operations of 1005 may be performed in accordance with examples as disclosed herein. In some examples, aspects of the operations of 1005 may be performed by a coordination message receiver 725 as described with reference to FIG. 7.

At 1010, the method may include determining a resource selection window based on remaining packet delay budget associated with the first UE. The operations of 1010 may be performed in accordance with examples as disclosed herein. In some examples, aspects of the operations of 1010 may be performed by a selection window component 730 as described with reference to FIG. 7.

At 1015, the method may include determining the resource selection window based on the preference of the second UE for the one or more sets of resources such that at least one resource of the one or more sets of resources indicated in the coordination message is included in the resource selection window. The operations of 1015 may be performed in accordance with examples as disclosed herein. In some examples, aspects of the operations of 1015 may be performed by a selection window component 730 as described with reference to FIG. 7.

At 1020, the method may include determining a set of candidate resources in the resource selection window for resource selection by the first UE based on the preference of the second UE for the one or more sets of resources. The operations of 1020 may be performed in accordance with examples as disclosed herein. In some examples, aspects of the operations of 1020 may be performed by a candidate resource manager 735 as described with reference to FIG. 7.

At 1025, the method may include performing a resource selection procedure in the resource selection window to select a set of resources from the set of candidate resources. The operations of 1025 may be performed in accordance with examples as disclosed herein. In some examples, aspects of the operations of 1025 may be performed by a resource selection component 740 as described with reference to FIG. 7.

At 1030, the method may include transmitting, by the first UE, a sidelink message using the set of resources. The operations of 1030 may be performed in accordance with examples as disclosed herein. In some examples, aspects of the operations of 1030 may be performed by a sidelink message transmitter 745 as described with reference to FIG. 7.

Figure 11:
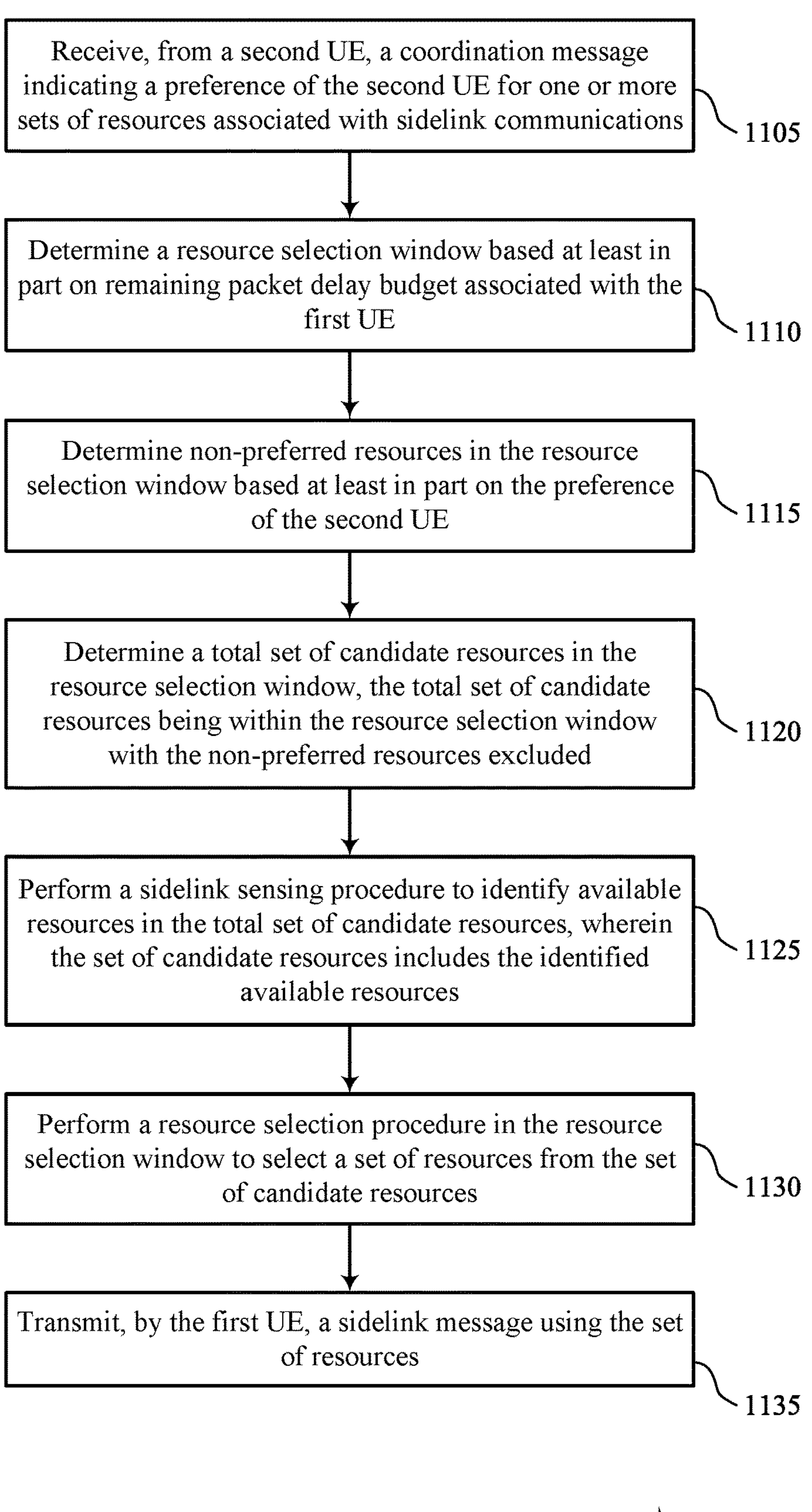

FIG. 11 shows a flowchart illustrating a method 1100 that supports inter-UE coordination information-based resource allocation in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include receiving, from a second UE, a coordination message indicating a preference of the second UE for one or more sets of resources associated with sidelink communications. The operations of 1105 may be performed in accordance with examples as disclosed herein. In some examples, aspects of the operations of 1105 may be performed by a coordination message receiver 725 as described with reference to FIG. 7.

At 1110, the method may include determining a resource selection window based on remaining packet delay budget associated with the first UE. The operations of 1110 may be performed in accordance with examples as disclosed herein. In some examples, aspects of the operations of 1110 may be performed by a selection window component 730 as described with reference to FIG. 7.

At 1115, the method may include determining non-preferred resources in the resource selection window based on the preference of the second UE. The operations of 1115 may be performed in accordance with examples as disclosed herein. In some examples, aspects of the operations of 1115 may be performed by a resource manager 750 as described with reference to FIG. 7.

At 1120, the method may include determining a total set of candidate resources in the resource selection window, the total set of candidate resources being within the resource selection window with the non-preferred resources excluded. The operations of 1120 may be performed in accordance with examples as disclosed herein. In some examples, aspects of the operations of 1120 may be performed by a candidate resource manager 735 as described with reference to FIG. 7.

At 1125, the method may include performing a sidelink sensing procedure to identify available resources in the total set of candidate resources, where the set of candidate resources includes the identified available resources. The operations of 1125 may be performed in accordance with examples as disclosed herein. In some examples, aspects of the operations of 1125 may be performed by a sensing component 755 as described with reference to FIG. 7.

At 1130, the method may include performing a resource selection procedure in the resource selection window to select a set of resources from the set of candidate resources. The operations of 1130 may be performed in accordance with examples as disclosed herein. In some examples, aspects of the operations of 1130 may be performed by a resource selection component 740 as described with reference to FIG. 7.

At 1135, the method may include transmitting, by the first UE, a sidelink message using the set of resources. The operations of 1135 may be performed in accordance with examples as disclosed herein. In some examples, aspects of the operations of 1135 may be performed by a sidelink message transmitter 745 as described with reference to FIG. 7.

Figure 12:
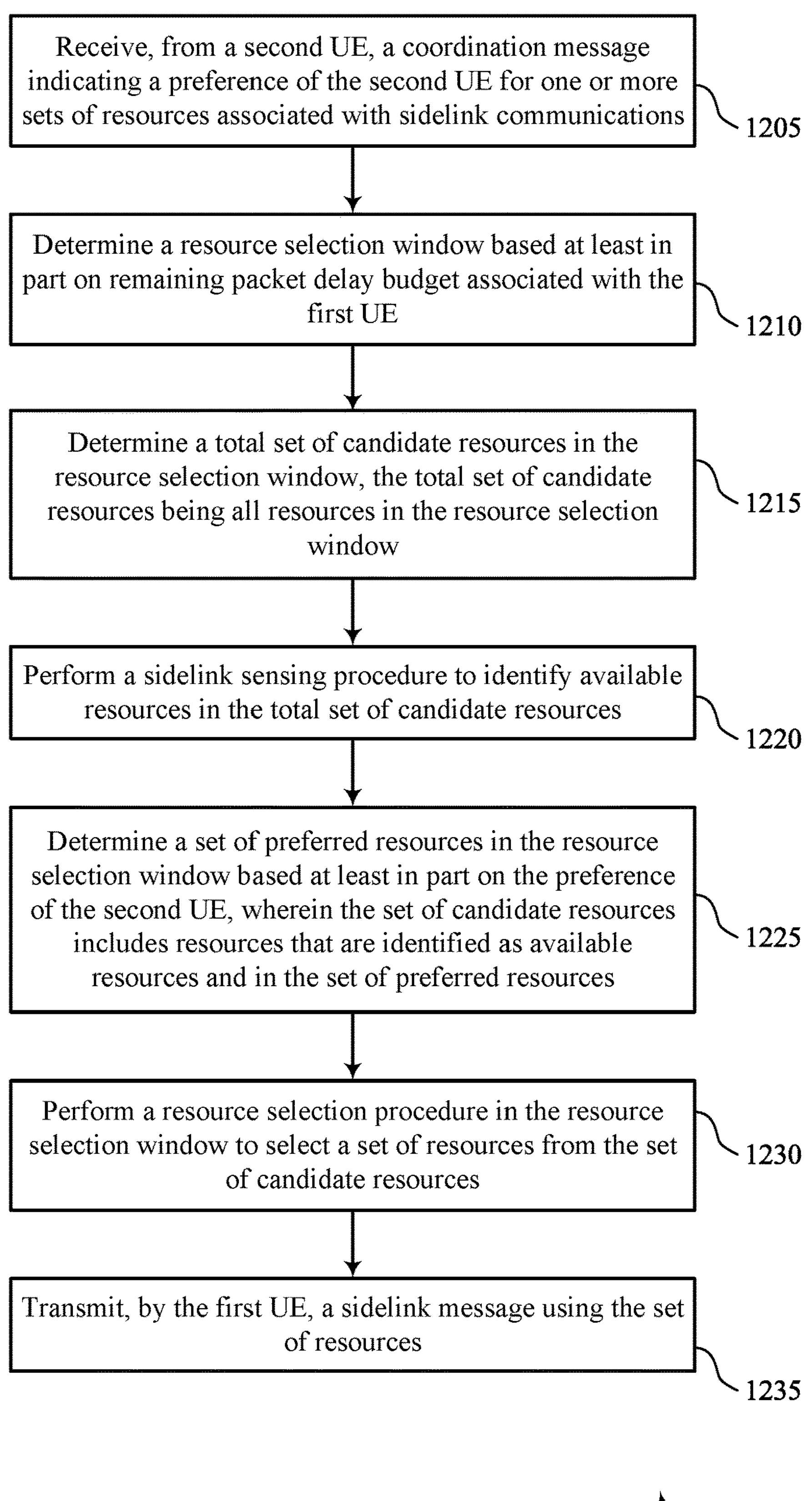

FIG. 12 shows a flowchart illustrating a method 1200 that supports inter-UE coordination information-based resource allocation in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include receiving, from a second UE, a coordination message indicating a preference of the second UE for one or more sets of resources associated with sidelink communications. The operations of 1205 may be performed in accordance with examples as disclosed herein. In some examples, aspects of the operations of 1205 may be performed by a coordination message receiver 725 as described with reference to FIG. 7.

At 1210, the method may include determining a resource selection window based on remaining packet delay budget associated with the first UE. The operations of 1210 may be performed in accordance with examples as disclosed herein. In some examples, aspects of the operations of 1210 may be performed by a selection window component 730 as described with reference to FIG. 7.

At 1215, the method may include determining a total set of candidate resources in the resource selection window, the total set of candidate resources being all resources in the resource selection window. The operations of 1215 may be performed in accordance with examples as disclosed herein. In some examples, aspects of the operations of 1215 may be performed by a candidate resource manager 735 as described with reference to FIG. 7.

At 1220, the method may include performing a sidelink sensing procedure to identify available resources in the total set of candidate resources. The operations of 1220 may be performed in accordance with examples as disclosed herein. In some examples, aspects of the operations of 1220 may be performed by a sensing component 755 as described with reference to FIG. 7.

At 1225, the method may include determining a set of preferred resources in the resource selection window based on the preference of the second UE, where the set of candidate resources includes resources that are identified as available resources and in the set of preferred resources. The operations of 1225 may be performed in accordance with examples as disclosed herein. In some examples, aspects of the operations of 1225 may be performed by a resource manager 750 as described with reference to FIG. 7.

At 1230, the method may include performing a resource selection procedure in the resource selection window to select a set of resources from the set of candidate resources. The operations of 1230 may be performed in accordance with examples as disclosed herein. In some examples, aspects of the operations of 1230 may be performed by a resource selection component 740 as described with reference to FIG. 7.

At 1235, the method may include transmitting, by the first UE, a sidelink message using the set of resources. The operations of 1235 may be performed in accordance with examples as disclosed herein. In some examples, aspects of the operations of 1235 may be performed by a sidelink message transmitter 745 as described with reference to FIG. 7.

The following provides an overview of aspects of the present disclosure:

Aspect 1: A method for wireless communication at a first UE, comprising: receiving, from a second UE, a coordination message indicating a preference of the second UE for one or more sets of resources associated with sidelink communications; determining a resource selection window based at least in part on remaining packet delay budget associated with the first UE; determining a set of candidate resources in the resource selection window for resource selection by the first UE based at least in part on the preference of the second UE for the one or more sets of resources; performing a resource selection procedure in the resource selection window to select a set of resources from the set of candidate resources; and transmitting, by the first UE, a sidelink message using the set of resources.

Aspect 2: The method of aspect 1, wherein determining the resource selection window comprises: determining the resource selection window based at least in part on the preference of the second UE for the one or more sets of resources such that at least one resource of the one or more sets of resources indicated in the coordination message is included in the resource selection window.

Aspect 3: The method of any of aspects 1 through 2, wherein determining the set of candidate resources in the resource selection window comprises: determining non-preferred resources in the resource selection window based at least in part on the preference of the second UE; determining a total set of candidate resources in the resource selection window, the total set of candidate resources being within the resource selection window with the non-preferred resources excluded; and performing a sidelink sensing procedure to identify available resources in the total set of candidate resources, wherein the set of candidate resources includes the identified available resources.

Aspect 4: The method of aspect 3, further comprising: receiving an indication of one or more non-preferred resources of the second UE within a time window, wherein the resource selection window at least partially overlaps in time with the time window and the non-preferred resources are determined based at least in part on the indication of the one or more non-preferred resources of the second UE.

Aspect 5: The method of any of aspects 3 through 4, wherein the coordination message comprises an indication of one or more preferred resources of the second UE within a time window, wherein the resource selection window excludes the one or more preferred resources of the second UE.

Aspect 6: The method of any of aspects 1 through 5, wherein determining the set of candidate resources in the resource selection window comprises: determining a total set of candidate resources in the resource selection window, the total set of candidate resources being all resources in the resource selection window; performing a sidelink sensing procedure to identify available resources in the total set of candidate resources; and determining a set of preferred resources in the resource selection window based at least in part on the preference of the second UE, wherein the set of candidate resources includes resources that are identified as available resources and in the set of preferred resources.

Aspect 7: The method of any of aspects 1 through 6, further comprising: performing a sidelink sensing procedure to identify available resources in the resource selection window, wherein the set of candidate resources includes the identified available resources.

Aspect 8: The method of aspect 7, wherein performing the sidelink sensing procedure comprises: decoding SCI from one or more other UEs; and identifying a first subset of resources within the resource selection window that are reserved by the one or more other UEs and a second subset of resources within the resource selection window comprising unscheduled resources based at least in part on decoding the SCI.

Aspect 9: The method of aspect 8, further comprising: measuring a received power associated with each resource of the first subset of resources; and determining the set of candidate resources as resources of the first subset of resources that satisfy a received power threshold based at least in part on the measuring.

Aspect 10: The method of aspect 9, further comprising: determining that a first number of candidate resources is below a threshold number of candidate resources, the first number of candidate resources comprising a number of the set of candidate resources including the resources that satisfy the received power threshold; and adjusting the received power threshold based at least in part on the first number of candidate resources being below the threshold number of candidate resources.

Aspect 11: The method of aspect 10, further comprising: transmitting the adjusted received power threshold to the second UE.

Aspect 12: The method of any of aspects 1 through 11, further comprising: receiving an indication of a threshold from the second UE, wherein the indicated preference of the second UE for the one or more sets of resources is based at least in part on the threshold.

Aspect 13: The method of aspect 12, further comprising: determining the set of candidate resources based at least in part on the threshold.

Aspect 14: The method of any of aspects 12 through 13, wherein the indication is received in the coordination message.

Aspect 15: The method of any of aspects 1 through 14, wherein the coordination message comprises a bitmap that indicates the preference of the second UE, wherein each bit of the bitmap indicates an availability of a respective resource within a time window.

Aspect 16: The method of aspect 15, wherein the resource selection window at least partially overlaps the time window.

Aspect 17: An apparatus for wireless communication at a first UE, comprising a processor; memory coupled with the processor; and instructions stored in the memory and executable by the processor to cause the apparatus to perform a method of any of aspects 1 through 16.

Aspect 18: An apparatus for wireless communication at a first UE, comprising at least one means for performing a method of any of aspects 1 through 16.

Aspect 19: A non-transitory computer-readable medium storing code for wireless communication at a first UE, the code comprising instructions executable by a processor to perform a method of any of aspects 1 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:

receiving, from a second UE, a coordination message indicating a preference of the second UE for one or more sets of resources associated with sidelink communications;

performing a sidelink sensing procedure to identify available resources, in a total set of candidate resources within a resource selection window that is based at least in part on remaining packet delay budget associated with the first UE, the total set of candidate resources excluding non-preferred resources that are based at least in part on the preference of the second UE for the one or more sets of resources;

performing a resource selection procedure in the resource selection window to select a set of resources from a set of candidate resources, the set of candidate resources including the available resources; and transmitting, by the first UE, a sidelink message using the set of resources.

2. The method of claim 1, wherein the resource selection window is based at least in part on the preference of the second UE for the one or more sets of resources such that at least one resource of the one or more sets of resources indicated in the coordination message is included in the resource selection window.

3. The method of claim 1, further comprising:

receiving an indication of one or more non-preferred resources of the second UE within a time window, wherein the resource selection window at least partially overlaps in time with the time window and the non-preferred resources are based at least in part on the indication of the one or more non-preferred resources of the second UE.

4. The method of claim 1, wherein the coordination message comprises an indication of one or more preferred resources of the second UE within a time window, wherein the resource selection window excludes the one or more preferred resources of the second UE.

5. The method of claim 1, wherein performing the sidelink sensing procedure comprises:

decoding sidelink control information from one or more other UEs, wherein, based at least in part on decoding the sidelink control information, a first subset of resources within the resource selection window are reserved by the one or more other UEs and a second subset of resources within the resource selection window include unscheduled resources.

6. The method of claim 5, further comprising:

measuring a received power associated with each resource of the first subset of resources, wherein the set of candidate resources comprises resources of the first subset of resources for which the received power satisfies a received power threshold.

7. The method of claim 6, further comprising:

adjusting the received power threshold based at least in part on a first number of candidate resources being below a threshold number of candidate resources, the first number of candidate resources comprising a number of the set of candidate resources including the resources that satisfy the received power threshold.

8. The method of claim 7, further comprising:

transmitting the adjusted received power threshold to the second UE.

9. The method of claim 1, further comprising:

receiving an indication of a threshold from the second UE, wherein the indicated preference of the second UE for the one or more sets of resources is based at least in part on the threshold.

10. The method of claim 9, wherein the set of candidate resources is based at least in part on the threshold.

11. The method of claim 9, wherein the indication is received in the coordination message.

12. The method of claim 1, wherein the coordination message comprises a bitmap that indicates the preference of the second UE, wherein each bit of the bitmap indicates an availability of a respective resource within a time window.

13. The method of claim 12, wherein the resource selection window at least partially overlaps the time window.

14. An apparatus for wireless communication at a first user equipment (UE), comprising:

at least one processor;

memory coupled with the at least one processor; and instructions stored in the memory and executable by the at least one processor to cause the apparatus to:

receive, from a second UE, a coordination message indicating a preference of the second UE for one or more sets of resources associated with sidelink communications;

perform a sidelink sensing procedure to identify available resources, in a total set of candidate resources within a resource selection window that is based at least in part on remaining packet delay budget associated with the first UE, the total set of candidate resources excluding non-preferred resources that are based at least in part on the preference of the second UE for the one or more sets of resources;

perform a resource selection procedure in the resource selection window to select a set of resources from a set of candidate resources, the set of candidate resources including the available resources; and transmit, by the first UE, a sidelink message using the set of resources.

15. The apparatus of claim 14, wherein the resource selection window is based at least in part on the preference of the second UE for the one or more sets of resources such that at least one resource of the one or more sets of resources indicated in the coordination message is included in the resource selection window.

16. The apparatus of claim 14, wherein the instructions are further executable by the at least one processor to cause the apparatus to:

receive an indication of one or more non-preferred resources of the second UE within a time window, wherein the resource selection window at least partially overlaps in time with the time window and the non-preferred resources are based at least in part on the indication of the one or more non-preferred resources of the second UE.

17. The apparatus of claim 14, wherein the coordination message comprises an indication of one or more preferred resources of the second UE within a time window, wherein the resource selection window excludes the one or more preferred resources of the second UE.

18. The apparatus of claim 14, wherein the instructions to perform the sidelink sensing procedure are executable by the at least one processor to cause the apparatus to:

decode sidelink control information from one or more other UEs, wherein, based at least in part on decoding the sidelink control information, a first subset of resources within the resource selection window are reserved by the one or more other UEs and a second subset of resources within the resource selection window comprising unscheduled resources.

19. The apparatus of claim 18, wherein the instructions are further executable by the at least one processor to cause the apparatus to:

measure a received power associated with each resource of the first subset of resources, wherein the set of candidate resources comprises resources of the first subset of resources that satisfy a received power threshold based at least in part on the measuring.

20. The apparatus of claim 19, wherein the instructions are further executable by the at least one processor to cause the apparatus to:

adjust the received power threshold based at least in part on a first number of candidate resources being below a threshold number of candidate resources, the first number of candidate resources comprising a number of the set of candidate resources including the resources that satisfy the received power threshold.

21. The apparatus of claim 20, wherein the instructions are further executable by the at least one processor to cause the apparatus to:

transmit the adjusted received power threshold to the second UE.

22. The apparatus of claim 14, wherein the instructions are further executable by the at least one processor to cause the apparatus to:

receive an indication of a threshold from the second UE, wherein the indicated preference of the second UE for the one or more sets of resources is based at least in part on the threshold.

23. The apparatus of claim 22, wherein the set of candidate resources is based at least in part on the threshold.

24. The apparatus of claim 22, wherein the indication is received in the coordination message.

* * * * *